(12) United States Patent
Johnson et al.

(10) Patent No.: US 11,203,281 B1
(45) Date of Patent: Dec. 21, 2021

(54) VISIBLE LIGHT MANIPULATING EMBLEM FOR A VEHICLE

(71) Applicant: Ford Global Technologies, LLC, Dearborn, MI (US)

(72) Inventors: Aaron Bradley Johnson, Allen Park, MI (US); Luciano Lukacs, Plymouth, MI (US); David Brian Glickman, Southfield, MI (US); Stuart C. Salter, White Lake, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/026,942

(22) Filed: Sep. 21, 2020

(51) Int. Cl.
| | | |
|---|---|---|
| *B60Q 1/02* | (2006.01) |
| *F21V 3/00* | (2015.01) |
| *F21V 8/00* | (2006.01) |
| *F21V 11/00* | (2015.01) |
| *B60R 13/00* | (2006.01) |
| *F21V 3/06* | (2018.01) |
| *F21Y 115/30* | (2016.01) |

(Continued)

(52) U.S. Cl.
CPC .............. *B60Q 1/02* (2013.01); *B60R 13/005* (2013.01); *F21V 3/00* (2013.01); *F21V 3/06* (2018.02); *F21V 11/00* (2013.01); *G02B 6/0011* (2013.01); *B60Q 2400/00* (2013.01); *F21W 2104/00* (2018.01); *F21Y 2113/10* (2016.08); *F21Y 2115/30* (2016.08)

(58) Field of Classification Search
CPC ....... B60R 13/005; G02B 6/0011; F21V 3/06; F21V 11/00
See application file for complete search history.

(56) References Cited

U.S. PATENT DOCUMENTS

| | | |
|---|---|---|
| 1,786,155 A | 12/1930 | Farrell |
| 2,063,207 A | 12/1936 | Taylor |
| 2,068,414 A | 1/1937 | Johnson |

(Continued)

FOREIGN PATENT DOCUMENTS

| | | |
|---|---|---|
| CN | 103692979 A | 4/2014 |
| CN | 203698421 U | 7/2014 |

(Continued)

OTHER PUBLICATIONS

First Office Action in Chinese Patent Application No. 2017102573891, dated Aug. 4, 2020, 15 pages.

*Primary Examiner* — Zheng Song
(74) *Attorney, Agent, or Firm* — David Coppiellie; Price Heneveld LLP

(57) ABSTRACT

An emblem for a vehicle comprises: (a) a light source configured to emit visible light; (b) a cover assembly disposed over the light source, the cover assembly having an inner surface, an outer surface, and a transparent portion that is transparent to the visible light, the visible light being incident to the inner surface, and the visible light that the light source emits transmitting through the transparent portion out of the outer surface to an external environment beyond the emblem; and (c) one or more surface relief patterns disposed on the cover assembly, the one or more surface relief patterns configured to manipulate (i) the visible light that the light source emits, (ii) visible light from the external environment, or (iii) both (i) and (ii).

19 Claims, 24 Drawing Sheets

(51) Int. Cl.
*F21Y 113/10* (2016.01)
*F21W 104/00* (2018.01)

(56) References Cited

U.S. PATENT DOCUMENTS

| | | | |
|---|---|---|---|
| 2,890,627 A | 6/1959 | Onksen | |
| 4,261,031 A | 4/1981 | Fratty | |
| 4,716,506 A | 12/1987 | Shang | |
| 4,765,724 A | 8/1988 | Huichun | |
| 4,816,968 A | 3/1989 | Yamada et al. | |
| 4,920,460 A | 4/1990 | Mori | |
| 4,977,695 A * | 12/1990 | Armbruster | B60R 13/005 40/541 |
| 4,999,936 A | 3/1991 | Calamia et al. | |
| 5,034,867 A | 7/1991 | Mayer | |
| 5,071,597 A | 12/1991 | D'Amato et al. | |
| 5,149,568 A * | 9/1992 | Beck | B44F 1/00 250/462.1 |
| 5,249,104 A * | 9/1993 | Mizobe | G02B 6/0018 362/327 |
| 5,612,102 A | 3/1997 | Nakama | |
| 5,703,667 A | 12/1997 | Ochiai | |
| 5,709,453 A | 1/1998 | Krent | |
| 5,779,341 A | 7/1998 | Chinniah | |
| 5,806,957 A * | 9/1998 | Prior | B60R 13/005 362/459 |
| 5,871,834 A | 2/1999 | Wang | |
| 6,068,890 A | 5/2000 | Kaumle | |
| 6,168,302 B1 | 1/2001 | Hulse | |
| 6,193,399 B1 | 2/2001 | Hulse | |
| 6,238,074 B1 | 5/2001 | Hulse et al. | |
| 6,285,472 B1 | 9/2001 | Odhner | |
| 6,308,444 B1 * | 10/2001 | Ki | F21V 1/22 40/546 |
| 6,372,341 B1 | 4/2002 | Jung | |
| D462,032 S | 8/2002 | Schmauz-Grimsel | |
| 6,525,111 B1 | 2/2003 | Spencer | |
| 6,896,387 B2 | 5/2005 | Renfro | |
| 7,068,434 B2 | 6/2006 | Florczak | |
| 7,976,931 B2 | 7/2011 | Schilling | |
| 7,998,383 B2 | 8/2011 | Lee | |
| 8,033,136 B2 | 10/2011 | Maltezos | |
| 8,314,989 B1 | 11/2012 | Mossberg | |
| 8,353,604 B2 | 1/2013 | Glazier | |
| 8,619,363 B1 | 12/2013 | Coleman | |
| 8,651,720 B2 | 2/2014 | Sherman | |
| 8,834,004 B2 | 9/2014 | Thompson | |
| 8,960,944 B2 | 2/2015 | Foo | |
| 9,062,386 B2 | 6/2015 | Reeder | |
| 9,068,708 B2 | 6/2015 | Antilla et al. | |
| 9,751,460 B1 | 9/2017 | Iordache et al. | |
| 9,809,161 B1 | 11/2017 | Salter et al. | |
| 10,040,392 B2 | 8/2018 | Salter et al. | |
| 10,479,270 B2 | 11/2019 | Salter et al. | |
| 10,685,515 B2 | 6/2020 | Hazebrouck et al. | |
| 10,737,613 B2 | 8/2020 | Salter et al. | |
| 2001/0040810 A1 | 11/2001 | Kusagaya | |
| 2002/0054434 A1 | 5/2002 | Florczak | |
| 2002/0080622 A1 | 6/2002 | Pashley | |
| 2006/0012307 A1 * | 1/2006 | Bucher | B60Q 1/50 315/77 |
| 2006/0016109 A1 | 1/2006 | Nicolaas | |
| 2006/0061153 A1 | 3/2006 | Hamamoto | |
| 2006/0097121 A1 | 5/2006 | Fugate | |
| 2006/0158888 A1 | 7/2006 | Wang | |
| 2006/0274540 A1 | 12/2006 | Klaver et al. | |
| 2009/0050454 A1 | 2/2009 | Matsukawa | |
| 2009/0134793 A1 | 5/2009 | Csech et al. | |
| 2010/0202154 A1 | 8/2010 | Hamkens | |
| 2011/0037243 A1 | 2/2011 | Laframboise | |
| 2012/0024010 A1 | 2/2012 | Maltezos | |
| 2012/0075842 A1 | 3/2012 | Goto | |
| 2012/0313392 A1 * | 12/2012 | Bingle | B60R 13/005 296/1.08 |
| 2013/0215271 A1 * | 8/2013 | Lu | B60R 13/005 348/148 |
| 2014/0093665 A1 * | 4/2014 | Horibe | B60R 13/04 428/31 |
| 2015/0079375 A1 | 3/2015 | Yang | |
| 2015/0371570 A1 | 12/2015 | Sciackitano | |
| 2016/0107371 A1 | 4/2016 | Hurme | |
| 2016/0231493 A1 | 8/2016 | Iordache | |
| 2016/0259109 A1 * | 9/2016 | Wolfing | G02B 6/0028 |
| 2017/0080784 A1 | 3/2017 | Kobayashi | |
| 2017/0297507 A1 | 10/2017 | Dellock et al. | |
| 2017/0297508 A1 * | 10/2017 | Dellock | B60R 13/005 |
| 2017/0357044 A1 * | 12/2017 | Kuramitsu | G02B 6/0088 |
| 2018/0011324 A1 | 1/2018 | Popovich et al. | |
| 2019/0092228 A1 | 3/2019 | Salter et al. | |
| 2019/0168663 A1 * | 6/2019 | Nykerk | B60Q 1/503 |
| 2019/0217659 A1 | 7/2019 | Dellock et al. | |
| 2019/0219746 A1 | 7/2019 | Dellock et al. | |
| 2020/0166195 A1 | 5/2020 | Chen | |
| 2021/0009030 A1 * | 1/2021 | Ho | B60R 13/005 |

FOREIGN PATENT DOCUMENTS

| | | |
|---|---|---|
| CN | 105383406 A | 3/2016 |
| EP | 0870655 A1 | 10/1998 |
| JP | H0572593 U | 10/1993 |
| JP | 2006023567 A | 1/2006 |
| JP | 2010214798 A | 9/2010 |
| JP | 2013154670 A | 8/2013 |
| KR | 101209331 | 11/2012 |
| WO | 9704339 | 2/1997 |

\* cited by examiner

VISIBLE LIGHT MANIPULATING EMBLEM FOR A VEHICLE

FIELD OF THE DISCLOSURE

The present disclosure relates to the field of vehicles and, more specifically, emblems for and on vehicles that generate visual effects and perform various other functions.

BACKGROUND OF THE DISCLOSURE

The manufacturer of a vehicle sometimes places an emblem on the vehicle to identify the manufacturer as the source of the vehicle to another person that sees the vehicle. The emblem has historically been a stylized piece of metal or plastic, typically including the name or logo of the manufacturer or the particular model of the vehicle. There is a general need for emblems that have distinguishing visual effects.

SUMMARY OF THE DISCLOSURE

The present disclosure addresses that general need with an emblem that includes a light source and a lens with one or more surface relief patterns that manipulate visible light that the light source emits into an object image or into diffracted wavelengths. The one or more surface relief patterns, in embodiments, manipulate ambient light, such as from the sun, into the object image or into diffracted wavelengths. In embodiments, a vehicle with the emblem activates the light source in response to a triggering event, such as an approved mobile device approaching the vehicle, as a welcoming feature.

According to a first aspect of the present disclosure, an emblem for a vehicle comprises: (a) a light source configured to emit visible light; (b) a cover assembly disposed over the light source, the cover assembly having an inner surface, an outer surface, and a transparent portion that is transparent to the visible light, the visible light being incident to the inner surface, and the visible light that the light source emits transmitting through the transparent portion out of the outer surface to an external environment beyond the emblem; and (c) one or more surface relief patterns disposed on the cover assembly, the one or more surface relief patterns configured to manipulate (i) the visible light that the light source emits, (ii) visible light from the external environment, or (iii) both (i) and (ii).

Embodiments of the first aspect of the present disclosure can include any one or a combination of the following features:
  the emblem further comprises: a light guide disposed between the light source and the cover assembly, the light guide having (i) a first end positioned to accept the visible light emitted by the light source and (ii) a second end positioned to emit the visible light toward the transparent portion of the cover assembly;
  the light source comprises a laser diode;
  the light source comprises a first laser diode configured to emit light having a dominant wavelength of 625 nm to 740 nm, a second laser diode configured to emit light having a dominant wavelength of 500 nm to 575 nm, and a third laser diode configured to emit light having a dominant wavelength of 450 nm to 485 nm;
  the visible light of the different wavelengths intermix within the light guide and transmits through the second end of the light guide as visible light with a substantially white color;
  the emblem further comprises an image filter disposed between the light source and the external environment; the image filter receives the visible light emitted by the light source and transmits the visible light as an image pattern that projects to the external environment;
  the emblem further comprises an image sensor unit positioned to capture an image of the external environment;
  the surface relief pattern comprises a diffraction grating that is configured to manipulate the visible light that the light source emits;
  the light source is configured to emit visible light having wavelengths of (i) 625 nm to 740 nm, (ii) 500 nm to 575 nm, and (iii) 450 nm to 485 nm;
  the surface relief pattern comprises a diffraction grating disposed into a reflective layer, and the surface relief pattern is configured to manipulate visible light from the external environment;
  the surface relief pattern comprises an interference pattern that produces an object image, and the object image is visible from the external environment;
  the interference pattern manipulates the visible light having the substantially white color to produce the image of the object;
  the cover assembly further comprises a metalized portion comprising metal deposited onto the transparent portion;
  the metalized portion transmits at least a portion of the visible light emitted by the light source to the external environment; and
  the second end of the light guide is visible through the transparent portion of the cover assembly from the external environment when the light source is not emitting light.

According to a second aspect of the present disclosure, an emblem for a vehicle comprises: a flat panel display configured to emit visible light; and a cover assembly disposed over the flat panel display, the cover assembly having an inner surface, an outer surface, and a transparent portion that is transparent to the visible light, the visible light being incident to the inner surface, and the visible light that the flat panel display emits transmits through the transparent portion to an external environment beyond the emblem.

Embodiments of the second aspect of the present disclosure can include any one or a combination of the following features:
  the emblem further comprises one or more surface relief patterns disposed on the cover assembly, the one or more surface relief patterns configured to manipulate (i) the visible light that the flat panel display emits, (ii) visible light from the external environment, or (iii) both (i) and (ii);
  the surface relief pattern comprises an interference pattern that produces an image of an object, and the image is visible from the external environment; and
  the surface relief pattern comprises a diffraction grating that is configured to manipulate the visible light that the flat panel display emits.

According to a third aspect of the present disclosure, a vehicle comprises: an exterior facing an external environment surrounding the vehicle; an emblem disposed at the exterior facing the external environment, the emblem comprising a light source configured to emit light that transmits to the external environment; and a controller in communication with the light source of the emblem, the controller configured to cause the light source to emit the visible light upon a detected triggering event.

Embodiments of a third aspect of the present disclosure can include any one or a combination of the following features:
- the vehicle further comprises: an antenna module, in communication with the controller and configured to be in communication with an authorized mobile device and to determine a strength of signal from the authorized mobile device indicative of a distance between the authorized mobile device and the antenna module;
- the detected triggering event comprises detection that the distance between the mobile device and the antenna module has (i) moved from a far position exceeding a predetermined distance from the vehicle to a near position within the predetermined distance from the vehicle or (ii) moved from the near position to the far position;
- the emblem further comprises an image filter disposed between the light source and the external environment; and
- upon the detected triggering event, (i) the light source emits the visible light, and (ii) the image filter receives the visible light and transmits the visible light as an image pattern into the external environment.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1A:
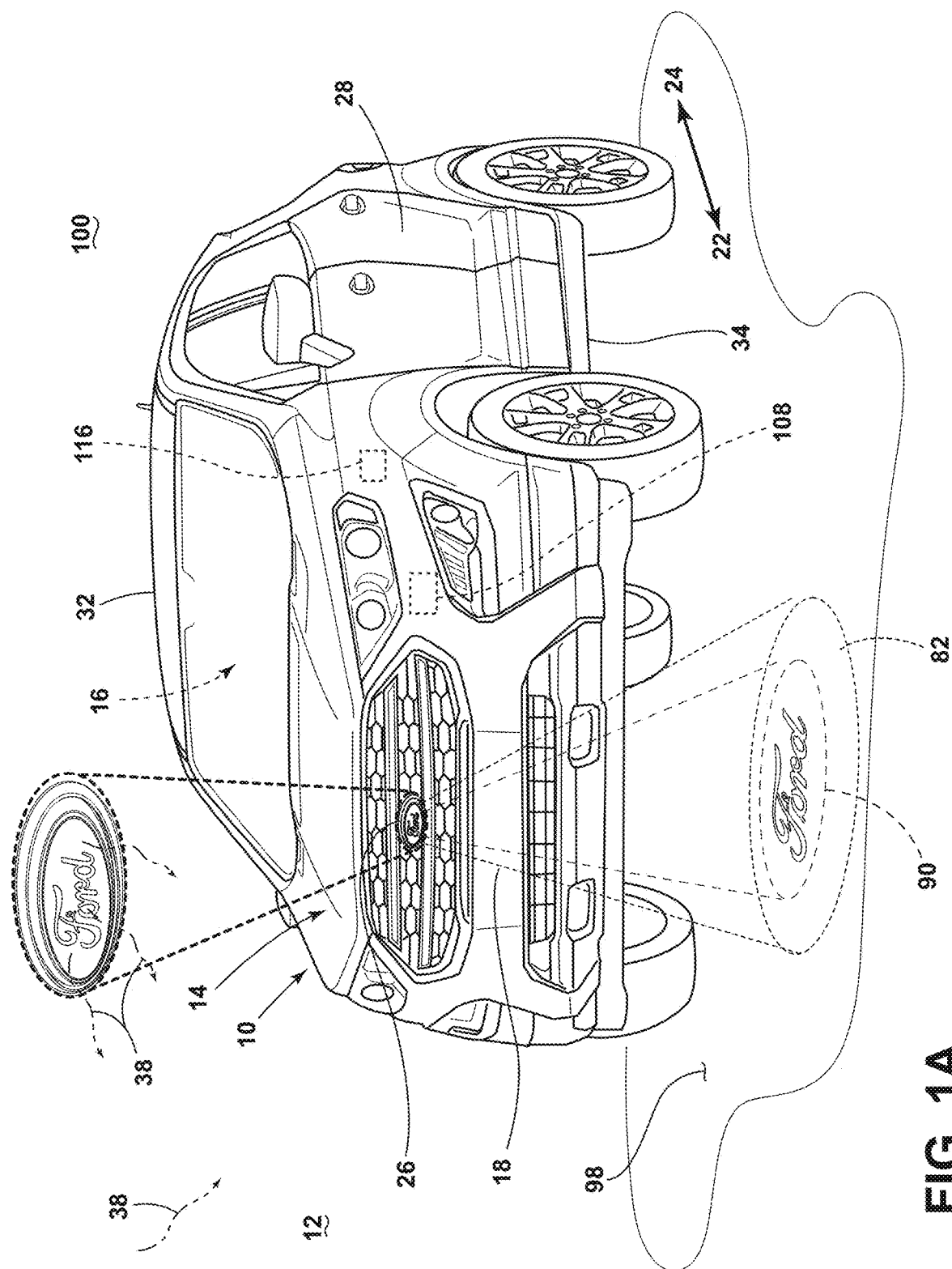
FIG. 1A is a perspective view of a vehicle of the present disclosure, illustrating an emblem emitting visible light into an external environment that surrounds the vehicle as well as projecting an image pattern onto a ground of the external environment.
Figure 1B:
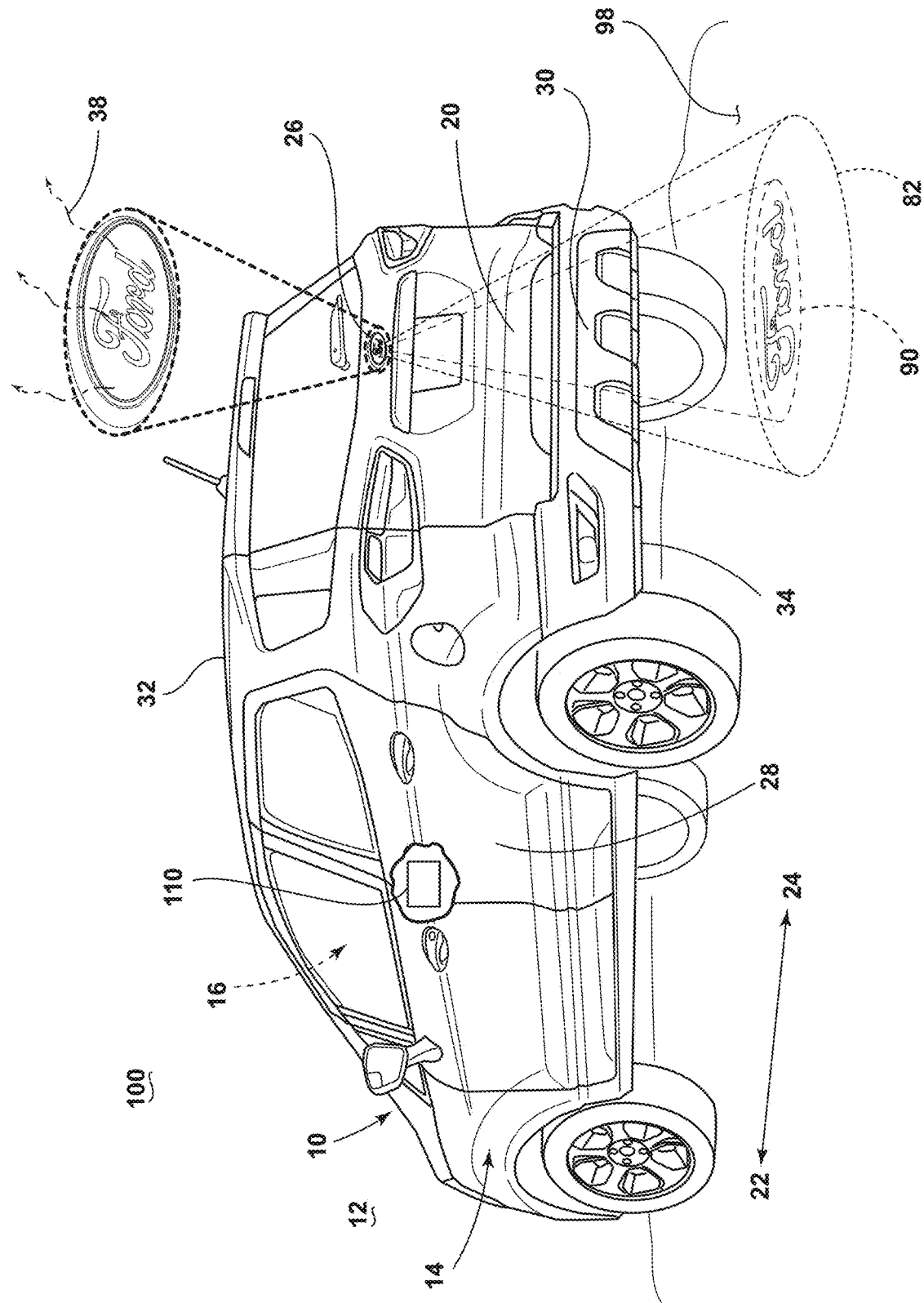
FIG. 1B is another perspective view of the vehicle of FIG. 1, illustrating another emblem emitting visible light into the external environment as well as projecting an image pattern onto a ground of the external environment.
Figure 2A:
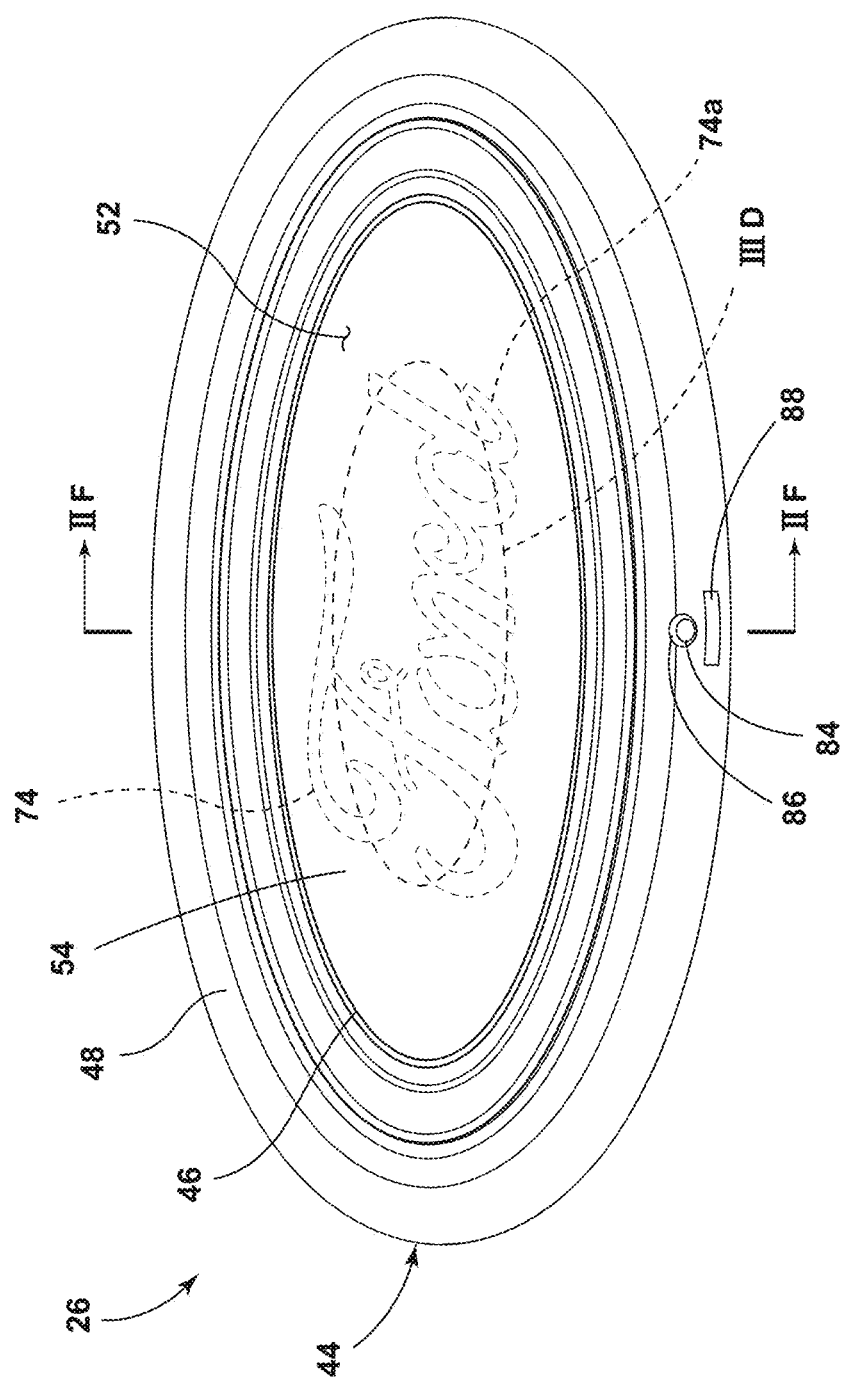
FIG. 2A is a view of the emblem of FIG. 1A, illustrating a cover assembly having a transparent portion and a light guide covered by the cover assembly.
Figure 2B:
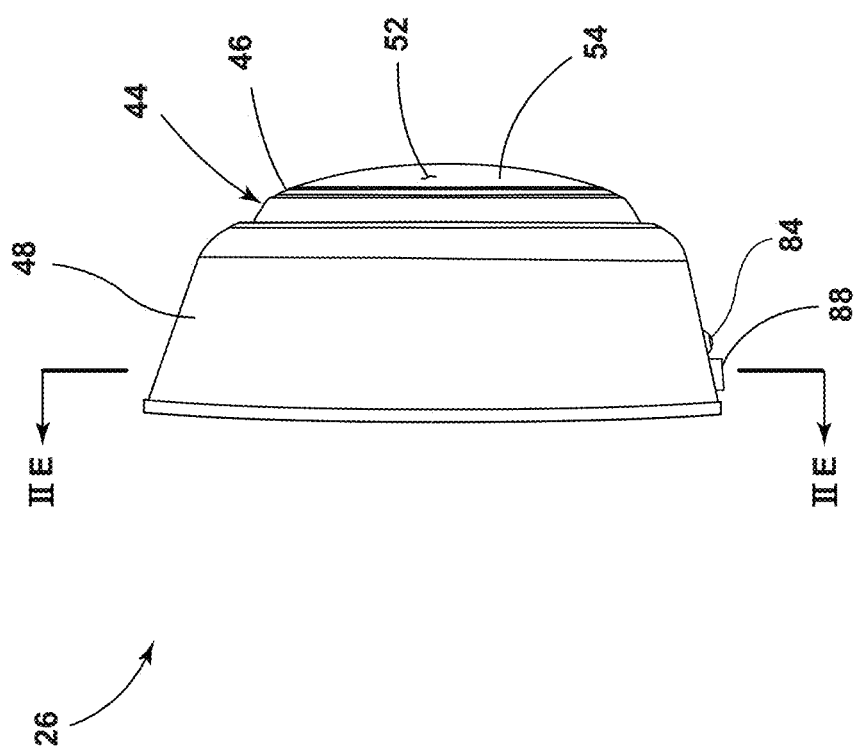
FIG. 2B is a side view of the emblem of FIG. 1A, illustrating a lens of image sensor unit, and an image filter, projecting out of the cover assembly.
Figure 2C:
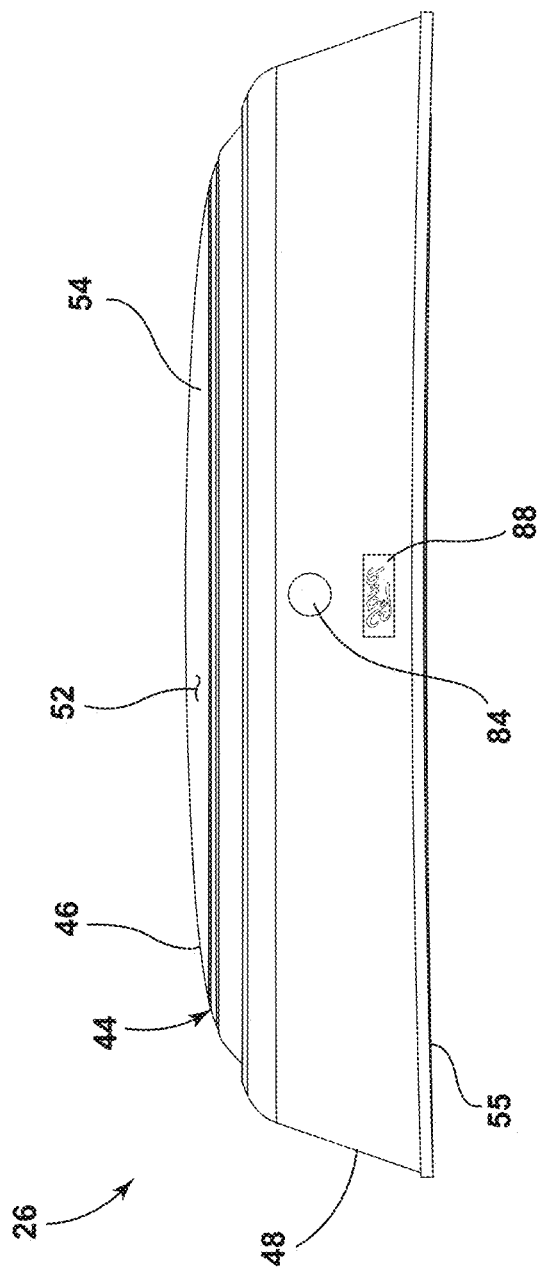
FIG. 2C is an elevation view of the emblem of FIG. 1A.
Figure 2D:
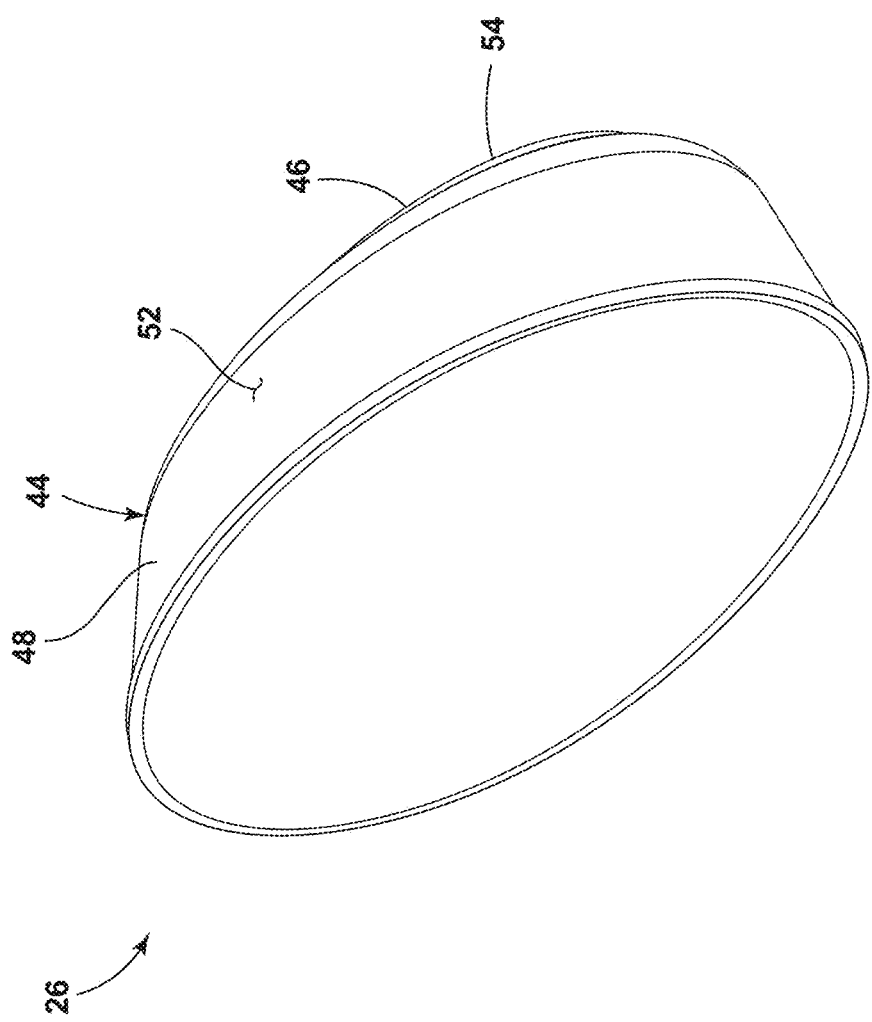
FIG. 2D is a perspective view of the emblem of FIG. 1A.
Figure 2E:
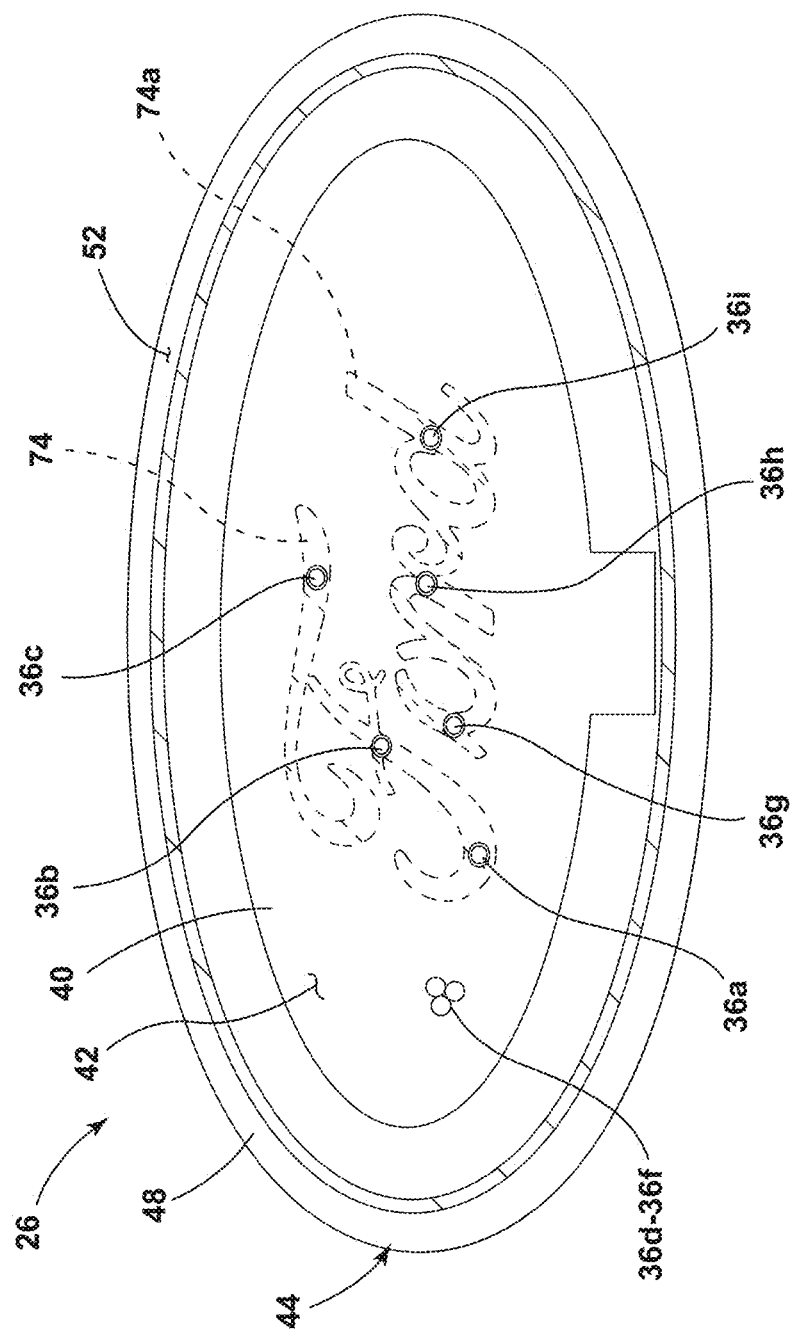
FIG. 2E is a cross-sectional view of the emblem of FIG. 1A taken along the line IIE-IIE of FIG. 2B, illustrating a light source including a variety of laser diodes and light emitting diodes attached to a printed circuit board.
Figure 2F:
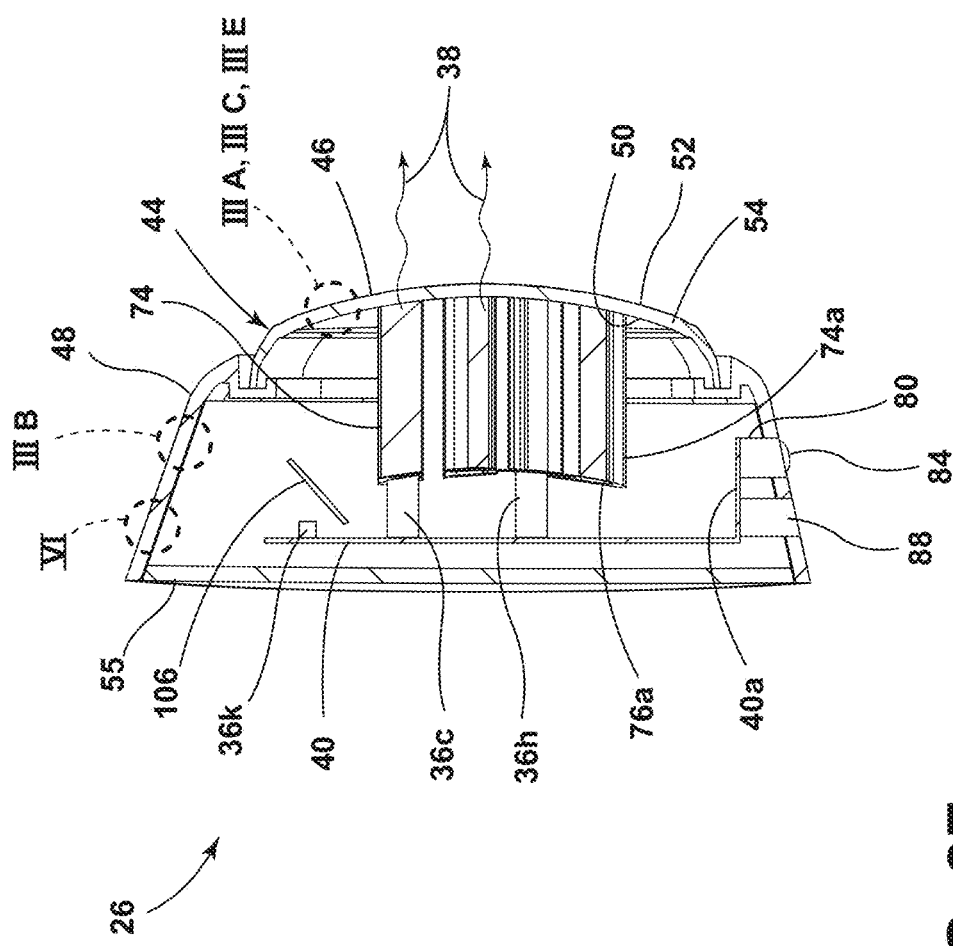
FIG. 2F is a cross-sectional view of the emblem of FIG. 1A taken along the line IIF-IIF of FIG. 2A, illustrating various of the disparate light sources positioned to emit visible light into a light guide, which transmits the visible light to a transparent portion of the cover assembly, which then transmits the visible light to the external environment.
Figure 2G:
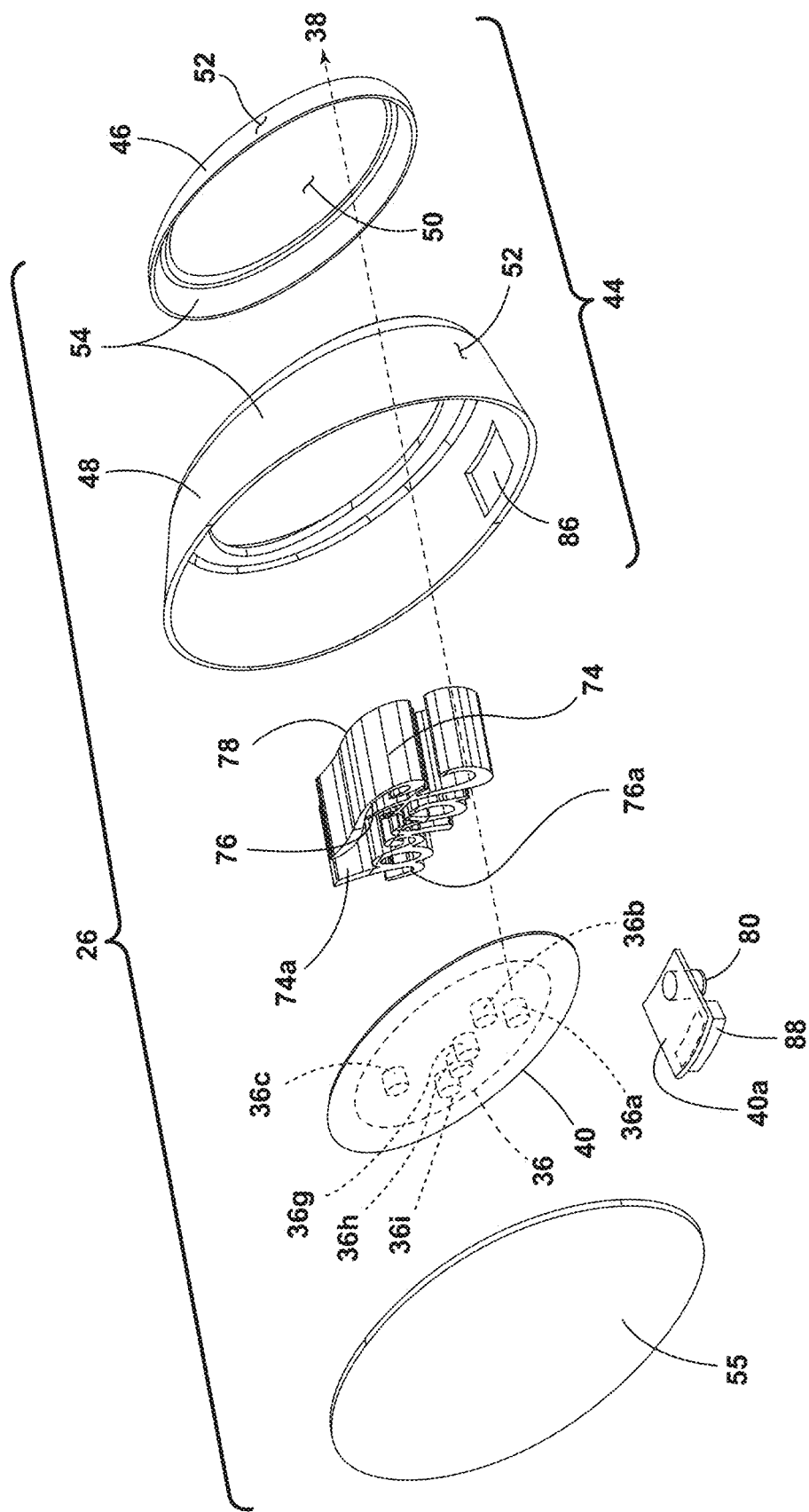
FIG. 2G is a blown-up perspective view of the emblem of FIG. 1A, illustrating the cover assembly including a first piece and a second piece.
Figure 2H:
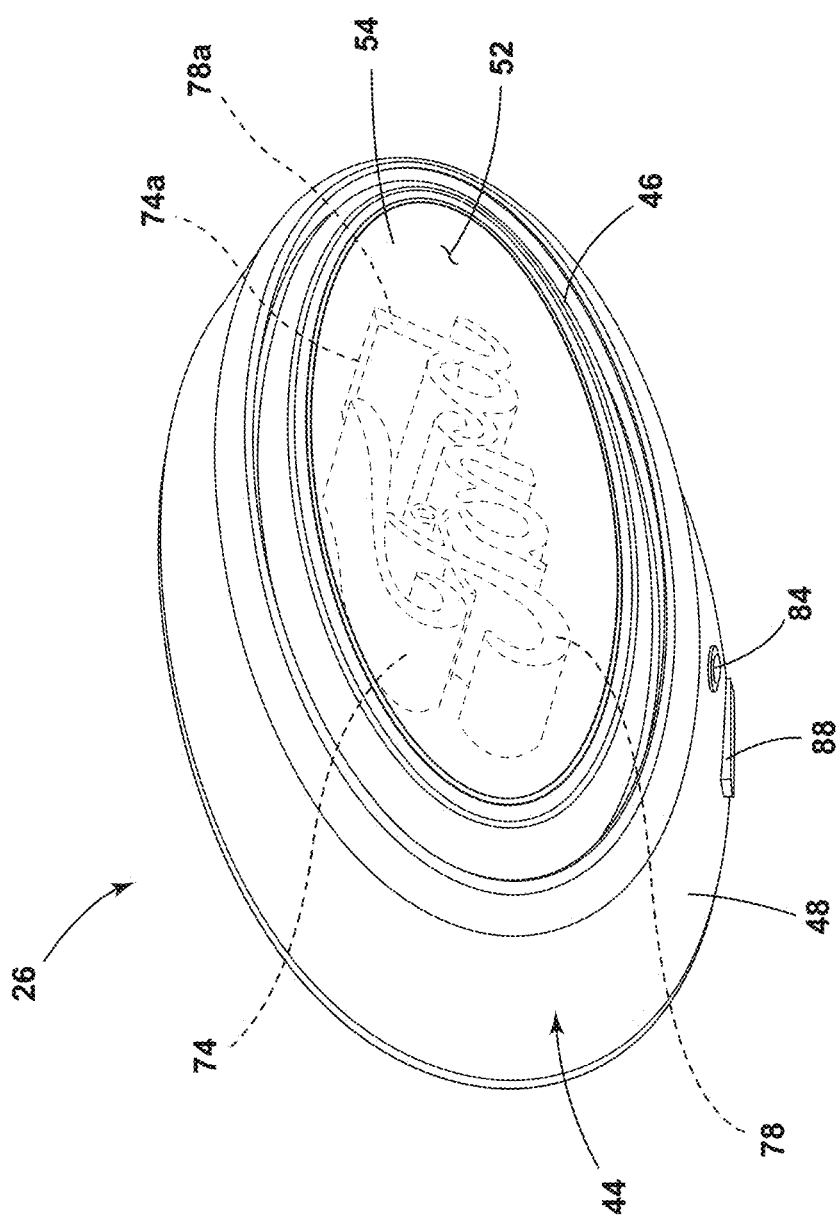
FIG. 2H is a perspective view of the emblem of FIG. 1A, illustrating a second end of the light guide visible through the transparent portion of the cover assembly.

Referring now to FIGS. 1A and 1B, a vehicle 10 is illustrated surrounded by an external environment 12. The vehicle 10 includes an exterior 14 that faces the external environment 12. The vehicle 10 further includes an interior 16. The exterior 14 of the vehicle 10 separates the interior 16 of the vehicle 10 from the external environment 12. The exterior 14 faces the external environment 12. The vehicle 10 further includes a first end 18 and a second end 20. In embodiments, the first end 18 faces in a forward direction 22 while the second end 20 faces in a rearward direction 24. "Forward direction" refers to a direction of travel of the vehicle 10 during normal operation of the vehicle 10. "Rearward direction" refers to an opposite direction of travel, such as when the vehicle 10 is in "reverse." The vehicle 10 can be a car, truck, van, sports utility vehicle, and the like. The vehicle 10 can have an electric motor, a combustion engine, or both. The vehicle 10 can be fully passenger controlled, fully autonomous, or semi-autonomous. The vehicle 10 can be utilized for ride-hailing, ride-sharing, individual, public, or private purposes.

The vehicle 10 further includes an emblem 26. In embodiments, the emblem 26 is disposed at the first end 18. In embodiments, the emblem 26 is disposed at the second end 20. In other embodiments, the emblem 26 is disposed elsewhere at the exterior 14 of the vehicle 10, such as on a door 28, a bumper 30, a top portion 32, or a bottom portion 34, or some combination of places of the exterior 14 of the vehicle 10.

Referring now to FIGS. 2A-2H, the emblem 26 includes a light source 36. In embodiments, the light source 36, when activated, emits visible light 38. "Visible light" means electromagnetic radiation having a wavelength in the visible spectrum. The visible spectrum is generally understood to be wavelengths of 380 nm to 740 nm. The light source 36 can be one or more incandescent bulbs, one or more light emitting diodes, one or more laser diodes, and the like. In embodiments, such as the illustrated embodiment, the light source 36 includes laser diodes 36a-36c. In embodiments, the light source 36 includes a first laser diode 36a configured to emit visible light 38 having a dominant wavelength of 625 nm to 740 nm, which is substantially red in color. In embodiments, the light source 36 further includes a second laser diode 36b configured to emit visible light 38 having a dominant wavelength of 500 nm to 575 nm, which is substantially green in color. In embodiments, the light source 36 further includes a third laser diode 36c configured to emit visible 38 light having a dominant wavelength of 450 nm to 485 nm, which is substantially blue in color. "Dominant wavelength" means, if the emitted visible light 38 has more than one wavelength, then the wavelength having the greatest intensity of the intensities of all the wavelengths is the dominant wavelength. Some laser diodes emit light having one wavelength, while others emit light having a range of wavelengths but have a dominant wavelength. References to light source 36 herein refers to the collection of individually referenced light sources, such as laser diodes 36a-36c, etc.

In embodiments, the emblem 26 further includes a printed circuit board 40. The light source 36, such as laser diodes 36a-36c, can be wired to and attached to the printed circuit board 40. The light source 36 can face a primary surface 42 of the printed circuit board 40. The primary surface 42 can be substantially planar and face toward the external environment 12 surrounding the vehicle 10. In embodiments, the printed circuit board 40 has a solder mask that is substantially white in color forming the primary surface 42. The primary surface 42 that the substantially white solder mask forms is more reflective than if the primary surface 42 were another color, such as green, and improves the intensity of the visible light 38 emitted to the external environment 12 from the emblem 26. The printed circuit board 40 can further include a metal core, such as aluminum, a heat sink, or both, to help dissipate heat generated by the light source 36.

The emblem 26 further includes a cover assembly 44 that is disposed over the light source 36. The cover assembly 44 separates the light source 36 from the external environment 12. In embodiments, such as the illustrated embodiments, the cover assembly 44 includes a first piece 46 and a second piece 48. In other embodiments, the cover assembly 44 can be one piece. The first piece 46 can be attached to the second piece 48 through snap-fit mechanisms, adhesive, fasteners, among other options.

The cover assembly 44 includes an inner surface 50 and an outer surface 52. The outer surface 52 faces the external environment 12. The inner surface 50 faces substantially inward toward the light source 36.

The cover assembly 44 further includes a transparent portion 54. The transparent portion 54 is transparent to the visible light 38 that the light source 36 emits. The transparent portion 54 is contiguous with the inner surface 50 and the outer surface 52. "Transparent" means transmission of at least 50 percent of the intensity of the visible light 38 that the light source 36 emits into the external environment 12 beyond the emblem 26. The first piece 46, the second piece 48, or both, of the cover assembly 44 can be formed of a transparent substrate, such as a polymer (e.g., a polycarbonate, polymethyl methacrylate, and others) or a glass. Portions of either or both of the first piece 46 and the second piece 48 can be non-transparent. The cover assembly 44 can further include a backing 55, for example, to support the printed circuit board 40.

The visible light 38 that the light source 36 emits is incident to the inner surface 50 of the cover assembly 44, including at the transparent portion 54. The visible light 38 then transmits through the transparent portion 54, out of the outer surface 52 of the cover assembly 44 at the transparent portion 54, and into the external environment 12 beyond the emblem 26 and the vehicle 10.

The emblem 26 further includes a surface relief pattern 56 disposed on the cover assembly 44. As will be further explained, the surface relief pattern 56 is configured to manipulate (i) the visible light 38 that the light source 36 emits, (ii) visible light 38 from the external environment 12, or (iii) both the visible light 38 that the light source 36 emits and the visible light 38 from the external environment 12. "Manipulates" means, without limitation, to change the direction of, the speed of transmission of, or intensity level of the visible light 38.

Figure 3A:
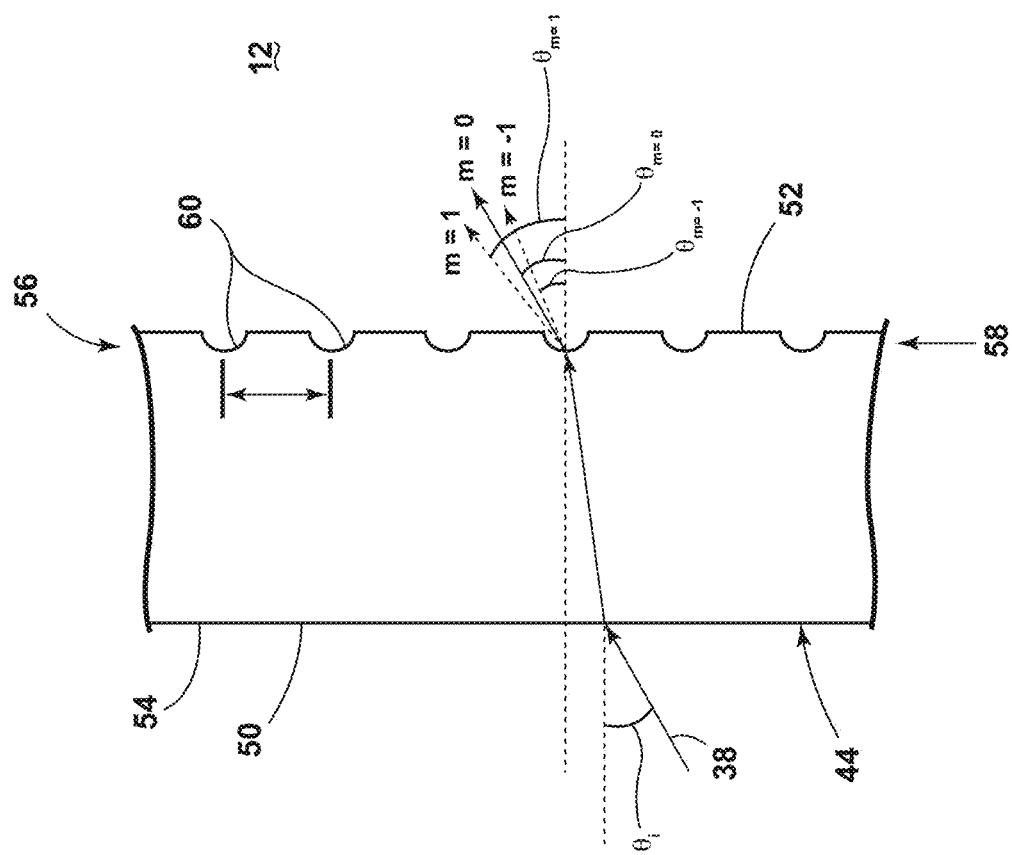
FIG. 3A is a cross-sectional view of area IIIA of FIG. 2F, illustrating the outer surface of the transparent portion of the cover assembly including a surface relief pattern forming a diffraction grating that manipulates the visible light transmitting through the transparent portion.

Referring now additionally to FIG. 3A, in embodiments, the surface relief pattern 56 includes a diffraction grating 58. The diffraction grating 58 manipulates the visible light 38 that the light source 36 emits as the visible light 38 transmits through the transparent portion 54 of the cover assembly 44. In embodiments, the diffraction grating 58 is disposed at the outer surface 52 of the transparent portion 54 of the cover assembly 44. The diffraction grating 58 includes repeated grooves 60 spaced at a distance 62 from each other. The distance 62 is the same between each groove 60, thus forming a periodic structure. In embodiments, the distance 62 is 400 nm to 800 nm. The visible light 38 enters the transparent portion 54 at the inner surface 50 at an angle $\theta_i$ relative to the normal of the inner surface 50. A portion of the visible light 38 is refracted and exits the outer surface 52 as if the grooves 60 were not present in a zero-order mode (m=0 exiting the grooves 60 at the outer surface 52 at angle $\theta_{m=0}$). A portion of the visible light 38, however, exits the grooves 60 and either constructively or destructively interfere. Maxima of the constructive interference occur at first order modes m=1 and m=−1, which exit the grooves 60 at the outer surface 52 at angles $\theta_{m=1}$ and $\theta_{m=-1}$, respectively. There are second order and third order modes as well at more exaggerated angles. If the visible light 38 is composed of different wavelengths, then each wavelength exits at different angles $\theta_{m=1}$ and $\theta_{m=-}1$ that are a function of the distance 62 and the wavelength. For example, if the visible light 38 incident to the inner surface 50 is composed of a substantially white in color combination of visible light 38 emitted from the first laser diode 36a (dominant wavelength of 625 nm to 740 nm), the second laser diode 36b (dominant wavelength of 500 nm to 575 nm), and the third laser diode 36c (dominant wavelength of 450 nm to 485 nm), then the disparate dominate wavelengths exit the diffraction grating 58 at disparate angles, making each individual color separately visible from the external environment 12. In embodiments, the light source 36 includes numerous light emitting diodes 36d-36f (see FIG. 2E) that emit visible light 38 in ranges of wavelengths that combine before becoming incident to the inner surface 50 to appear substantially white in color. After becoming incident to the inner surface 50, the diffraction grating 58 broadly separates the ranges of wavelengths thus producing a variety of different colors from the visible spectrum exiting the outer surface 52 that are visible from the external environment 12. In any event, the diffraction grating 58 generates multiple colors visible from the external environment 12 similar to a gemstone, which symbolizes luxury.

Figure 3B:
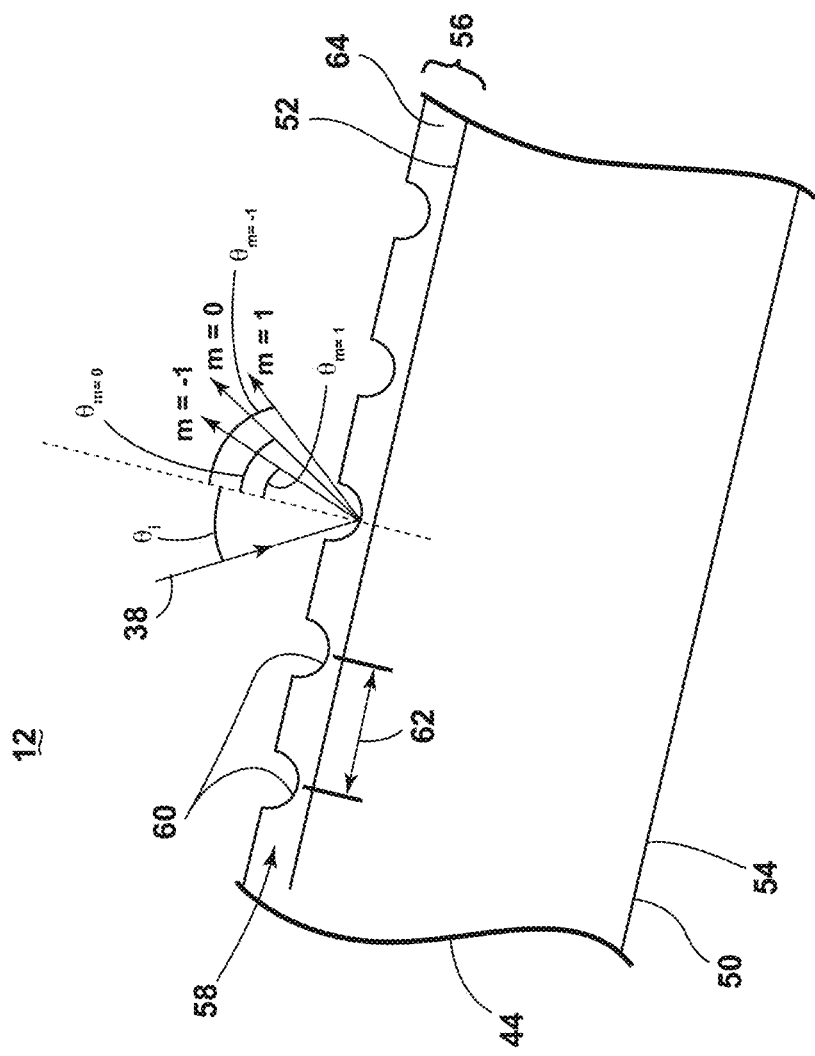
FIG. 3B is a cross-sectional view of area IIIB of FIG. 2F, illustrating a reflective layer over the outer surface of the transparent portion of the cover assembly including another surface relief pattern forming another diffraction grating that manipulates visible light from the external environment reflecting off of the cover assembly.

Referring now additionally to FIG. 3B, in embodiments, the diffraction grating 58 forming the surface relief pattern 56 of the emblem 26 is disposed into a reflective layer 64 disposed on the cover assembly 44. In embodiments, the reflective layer 64 forms the outer surface 52 of the cover assembly 44. The visible light 38 is incident to the grooves 60 at an angle $\theta_i$ relative to the normal of the outer surface 52. A portion of the visible light 38 is reflected off the outer surface 52 as if the grooves 60 were not present in a zero-order mode (m=0 reflecting off the grooves 60 at the outer surface 52 at angle $\theta_{m=0}$). A portion of the visible light 38, however, reflects off the grooves 60 and either constructively or destructively interfere. Maxima of the constructive interference occur at first order modes m=1 and m=−1, which reflects off the grooves 60 at the outer surface 52 at angles $\theta_{m=1}$ and $\theta_{m=-1}$, respectively. There are second order and third order modes as well at more exaggerated angles. If the visible light 38 is made up of different wavelengths, then each wavelength exits at different angles $\theta_{m=1}$ and $\theta_{m=-}1$ that are a function of the distance 62 and the wavelength. For example, if the visible light 38 incident to the inner surface 50 includes sunlight, which includes the entire range of wavelengths in the visible range, then each wavelength within the range reflect off the diffraction grating 58 at disparate angles, making a spectrum of colors visible from the external environment 12. The generation of the spectrum of colors visible from the external environment 12 is similar to a gemstone, again symbolizing luxury. In embodiments, there is no reflective layer 64 and a portion of the visible light 38 from the external environment 12 reflects off surface relief pattern 56, but to a lesser extent than if the reflective layer 64 was present because the visible light 38 from the external environment reflects off the surface relief pattern 56 primarily at angles of incidence greater than the critical angle.

Figure 3C:
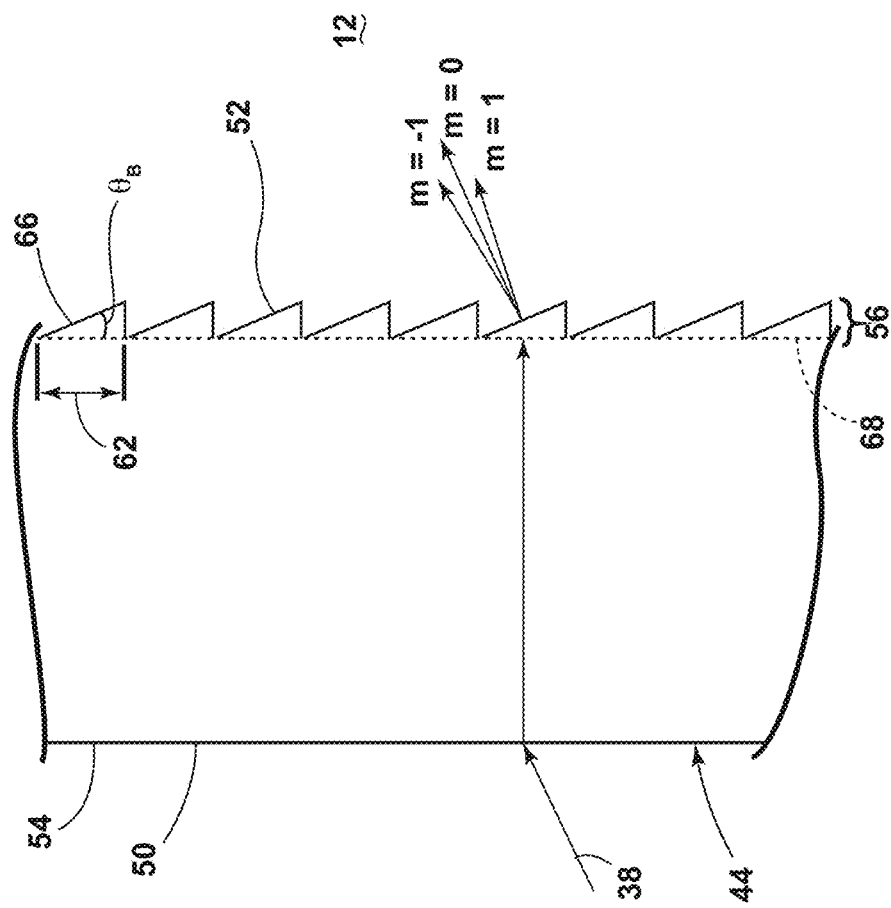
FIG. 3C is a cross-sectional view of area IIIC of FIG. 2F, illustrating the outer surface of the transparent portion of the cover assembly including another surface relief pattern forming a blazed grating that manipulates the visible light transmitting through the transparent portion.

Referring now to FIG. 3C, in embodiments, the diffraction grating 58 of forming the surface relief pattern 56 of the emblem 26 can be a blazed grating. Blazed gratings are commonly used in the field of spectroscopy to diffract only a specific wavelength of the incident visible light 38 for the purpose of concentrating light at that specific wavelength in the first order (or any non-zeroth order) of diffraction. The gratings have the distance 62 and take a saw-tooth shape. The distance 62 is the same between each grating, thus forming a periodic structure. A slope 66 of the gratings is angled at a blaze angle $\theta_B$ from a surface parallel 68. The blazed grating can be transmissive and manipulate the visible light 38 emitted from the light source 36 of the emblem 26. Alternatively, the blazed grating can be reflective and manipulate the visible light 38 emitted from the external environment 12. The blazed grating may be formed into the reflective layer 64 to increase reflectivity of the visible light 38 emitted from the external environment 12.

In embodiments, the surface relief pattern 56 has a first set of grooves 60 that are spaced at a constant spacing, and a second set of grooves 60 that are spaced at a constant, but different, spacing as the first set of grooves 60. In embodiments, the first set of grooves 60 are not parallel to the second set of grooves 60 and thus converge or diverge or both depending on direction. In embodiments, the distance 62 of the grooves 60 are not constant, which can manipulate the visible light 38 in an interesting manner. In embodiments, the diffraction grating 58 forming the surface relief pattern 56 is sinusoidal (see, e.g., FIG. 7E), which is sometimes referred to as a holographic grating.

The surface relief pattern 56 can be molded into the cover assembly 44, in embodiments where a molding process molds the cover assembly 44 from a moldable polymer. The molding process typically utilizes two or more molds, including a cavity mold and a core mold. The mold forming the surface relief pattern 56 can be laser machined to have the surface profile that forms the surface relief pattern 56 into the moldable polymer injected into the molds. For example, ultrashort pulse lasers produce sufficient energy to ablate the metal of the mold. Each pulse has a duration of approximately 200 femtoseconds to 1 picosecond. The wavelength of the pulse of laser energy can be in the ultraviolet range, but wavelengths in the visible and infrared ranges are also possible. The short time period of each pulse limits undesirable heat transfer to, and microcracking around, the ablated area. The reformation of ejected material onto the surface of the mold is additionally limited. Surface features having dimensions as small as 100 nm can be formed into the mold with such lasers.

During the molding process, the mold with the laser ablated surface profile to form the surface relief pattern 56 into the moldable polymer can be heated. Heating the mold maintains the moldable polymer at sufficiently low viscosity to flow and conform to the nanometer sized surface features of the mold. The mold can be heated via induction. Steam or a heated liquid piped into the mold can alternatively be used.

Figure 3D:
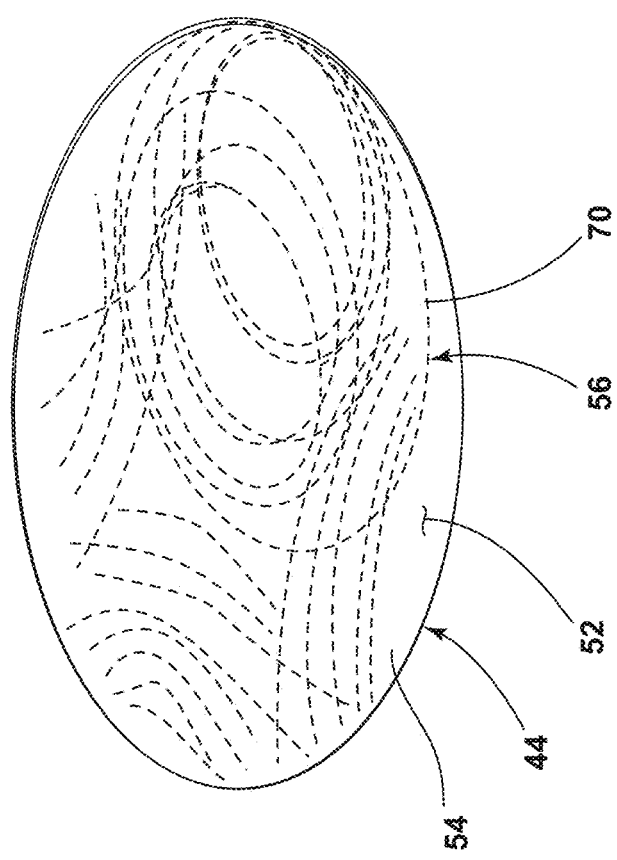
FIG. 3D is area IIID of FIG. 2A, illustrating the outer surface of the transparent portion including another surface relief pattern forming an interference pattern, which is a record of the light field reflected off of an object (i.e., a hologram)
Figure 3E:
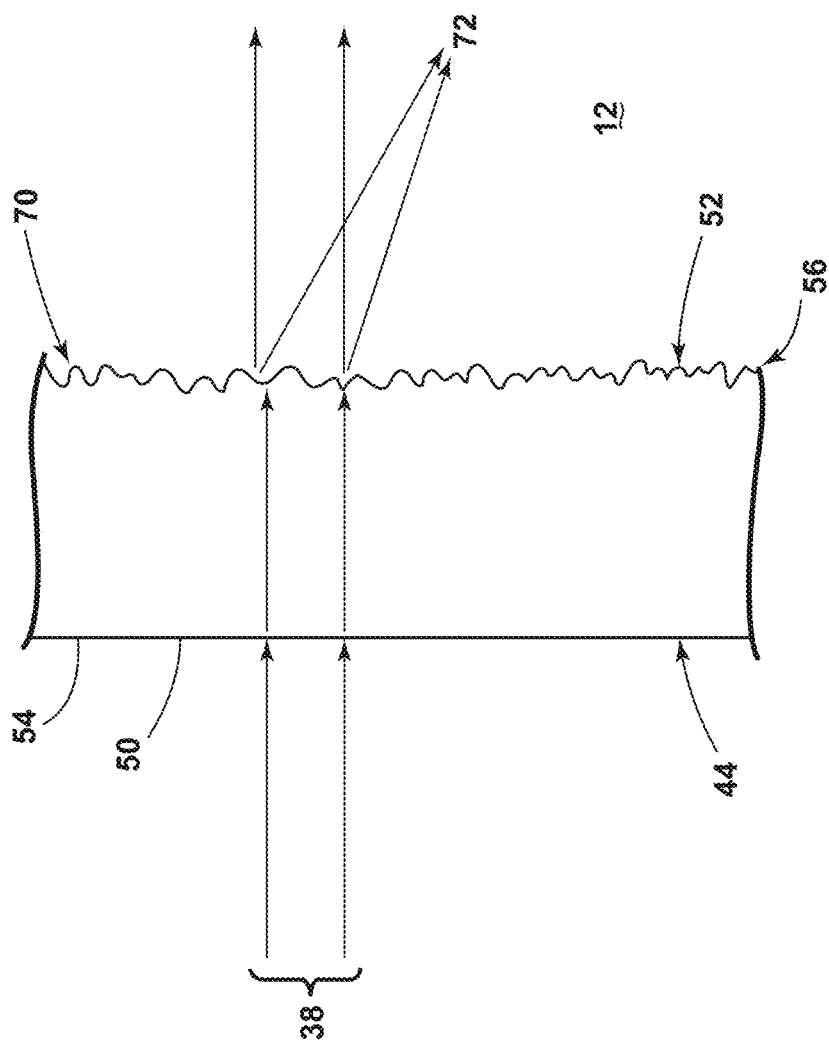
FIG. 3E is area IIIE of FIG. 2A, illustrating the interference pattern manipulating the visible light from the light source of the emblem into an object image visible from the external environment.

Referring now to FIGS. 3D and 3E, in embodiments, the surface relief pattern 56 includes an interference pattern 70 that produces an object image 72, and the object image 72 is visible from the external environment 12. The interference pattern 70 uses diffraction to produce the object image 72 as a three-dimensional light field. In other words, the surface relief pattern 56 includes a hologram. The interference pattern 70 is a diffraction grating 58. However, unlike the diffraction gratings 58 described in conjunction with FIGS. 3A-3C, which have grooves 60 with the constant distance 62 forming a periodic structure, the interference pattern 70 forming the hologram is not periodic.

To produce the interference pattern 70, a recording medium is exposed to a reference beam and an object beam reflecting off the object at issue that is the subject of the hologram. The reference beam and the object beam may be split from a common source beam. In embodiments, the common source beam is coherent (i.e., monochromatic). In embodiments, the common source beam has wavelengths across the visible spectrum (i.e., polychromatic) and the object beam is blocked except for a slit through which the object beam can pass through to the recording medium. The reference beam and the object beam form a light field at the recording medium. The light field has portions of constructive interference and portions of destructive interference that form the interference pattern 70. The interference pattern 70 is a record of the three-dimensional appearance of the portion of the object off which the object beam reflected.

The recording medium can be a photoresist material coated onto a substrate. The photoresist material hardens in response to light and thus in response to portions of constructive interference in the light field. Portions of destructive interference do not cause the photoresist material to harden. The portions of the photoresist material that did not harden can be washed away leaving only the portions of the photoresist material that did harden remaining on the substrate, effectively recording the interference pattern 70 as a developed medium. The remaining hardened portions can have nanometer dimensions. The remaining hardened photoresist material recording the interference pattern 70 is light absorbing. When only the reference beam encounters the recorded inference pattern, the interference pattern 70 diffracts or refracts the reference beam in manner that reconstructs an image of the object as the object image 72. The developed medium can be applied directly to the cover assembly 44, thus imparting the cover assembly 44 with the surface relied pattern including the interference pattern 70.

The developed medium can be replicated in a flexible film, such as via an embossing technique. In the embossing technique, metal is deposited over the hardened photoresist on the developed medium, such as through an electrodeposition technique. The developed medium is then separated from the metal thus leaving a metal mold. The metal mold can then be pressed against a polymer film with temperature to mold the interference pattern 70 into the polymer film. The polymer film with the interference pattern 70 can then be applied to the cover assembly 44.

Alternatively, the interference pattern 70 on the developed medium can be laser scanned. An ultrashort pulse laser as described above can then be utilized to replicate into a mold the surface features necessary to imprint the interference pattern 70 onto the cover assembly 44 directly.

As mentioned, when viewed from the external environment 12, the interference pattern 70 produces the object image 72. The object image 72 may appear to float between the viewer and the emblem 26 or may appear to float within the emblem 26. The light source 36 may transmit light through the interference pattern 70 to the external environment 12. In embodiments, the common source beam used to record the interference pattern 70 in the presence of the object at issue has a wavelength that is the same as the wavelength of the visible light 38 that the light source 36 emits. In embodiments, the common source beam used to record the interference pattern 70 in the presence of the object has a wavelength in common with the visible light 38 that the light source 36 emits. In embodiments, the common source beam used to record the interference pattern 70 in the presence of the object has a wavelength in common with the visible light 38 from the external environment 12. In embodiments, the common source beam was polychromatic and the visible light 38, whether from the light source 36 or the external environment 12, is polychromatic. In such embodiments, the object image 72 has colors that change as a function viewing position.

Figure 4:
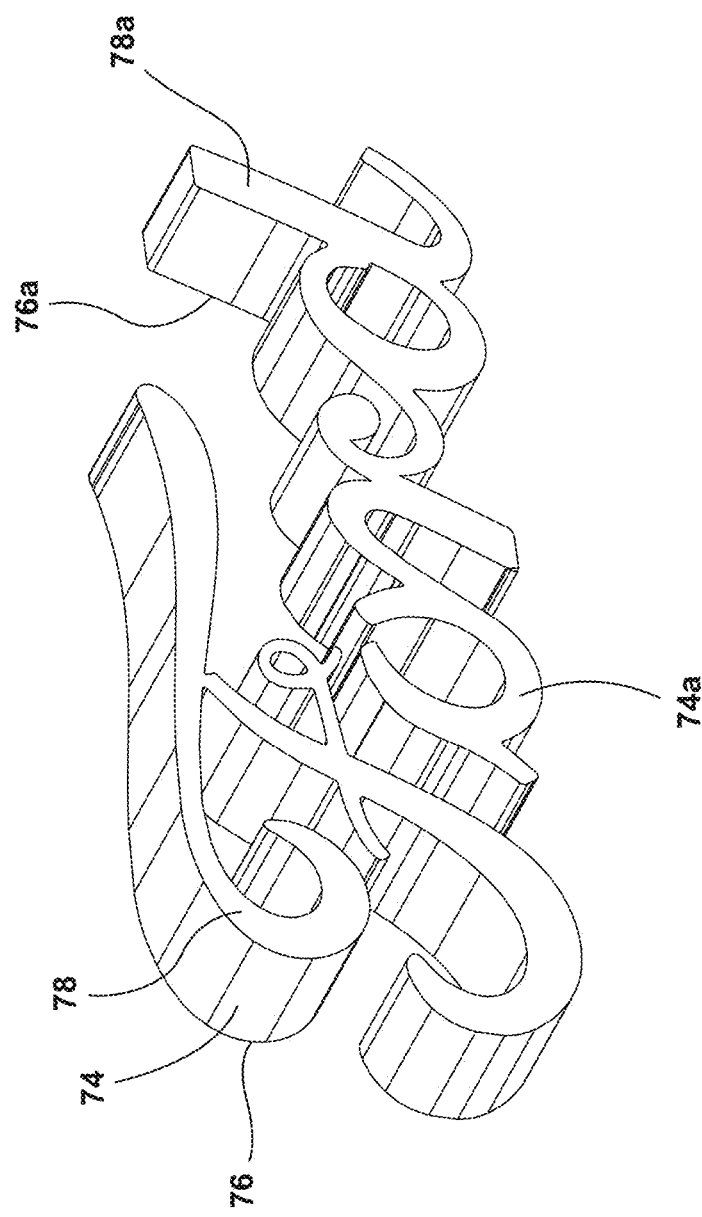
FIG. 4 is a perspective view of the light guide of FIG. 2A.

Referring now additionally to FIG. 4, in embodiments, the emblem 26 further includes a light guide 74. The light guide 74 is disposed between the light source 36 and the cover assembly 44, such as the first piece 46 of the cover assembly 44, of the emblem 26. The light guide 74 has a first end 76 and a second end 78. The first end 76 is positioned closer to the light source 36 than the second end 78. The second end 78 is closer to the external environment 12 than the first end 76. The first end 76 is positioned to accept the visible light 38 emitted by the light source 36. For example, the first end 76 can abut or be slightly spaced from the light source 36. The second end 78 is positioned to emit the visible light toward the transparent portion 54 of the cover assembly 44. For example, the second end 78 can abut or be slightly spaced from the inner surface 50 of the transparent portion 54 of the cover assembly 44.

The light guide 74 is substantially transparent to the wavelength(s) of the visible light 38 that the light source 36 emits. The light guide 74 transmits the visible light 38 from the first end 76 to the second end 78 either directly or with the assistance of internal reflection due to the difference in the indices of refraction of the light guide 74 and the air within the emblem 26 surrounding the light guide 74. The visible light 38 can emit from the second end 78 of the light guide 74 toward the surface relief pattern 56 on the cover assembly 44. The surface relief pattern 56 then manipulates the visible light 38 before emitting to the external environment 12, as discussed above. The light guide 74 can be made from polymethylmethacrylate or some other acrylic material, which can be molded to the desired shape. Silicone and polycarbonate are possible materials to form the light guide 74 as well.

In embodiments where the light source 36 includes the first laser diode 36a emitting visible light 38 having the dominant wavelength of 625 nm to 740 nm, the second laser diode 36b emitting visible light 38 having a dominant wavelength of 500 nm to 575 nm, and the third laser diode 36c emitting visible light 38 having a dominant wavelength of 450 nm to 485 nm, the first laser diode 36a, the second laser diode 36b, and the third laser diode 36c all emit their respective wavelengths of visible light 38 into the light guide 74 through the first end 76. The visible light 38 at the disparate wavelengths then intermix within the light guide 74. The visible light 38 then transmits through the second end 78 of the light guide 74 to the inner surface 50 of the cover assembly 44 with a substantially white color. In other embodiments, the light source 36 includes light emitting diodes 36d-36f of various wavelengths or wavelengths ranges, and those light emitting diodes 36d-36f emit their respective wavelengths of visible light 38 into the first end 76 of the light guide 74 and intermix within the light guide 74, with the visible light 38 having a substantially white color exiting the second end 78 of the light guide 74. In such embodiments, whether including light emitting diodes 36d-36f or the laser emitting diodes 36a-36c, the second end 78 emits the visible light 38 toward the interference pattern 70 recording the object as a holograph. The interference pattern 70 then manipulates the visible light 38 emitted from the second end 78 (having the substantially white color) to produce the object image 72. The object image 72 may have color(s) that change as a function of viewing position, each color having a wavelength that formed the visible light 38 emitted by the light source 36.

In embodiments, the second end 78 of the light guide 74 is visible through the transparent portion 54 of the cover assembly 44 from the external environment 12 when the light source 36 is not emitting visible light 38. For example, in the illustrated embodiment, the second end 78 of the light guide 74 is visible through at least the transparent portion 54 of the first piece 46 of the cover assembly 44, even when the light source 36 is not emitting visible light 38. The light guide 74 can be a logo, text, symbol, or something else that functions as a source identifier for the vehicle 10 to which the emblem 26 is attached, even when the light source 36 of the emblem 26 is not emitting visible light 38.

In embodiments, the emblem 26 further includes a second light guide 74a, again with a first end 76a facing the light source 36 of the emblem 26 and a second end 78a facing the transparent portion 54 of the cover assembly 44. In such embodiments, light source 36 can further include additional laser emitting diodes 36g-36i or light emitting diodes positioned to emit visible light 38 into the first end 76a of the second light guide 74a. The laser emitting diodes emit visible light 38 having red, green, and blue wavelengths respectively.

In embodiments, the emblem 26 further includes an image sensor unit 80. The image sensor unit 80 can be positioned to capture an image of the external environment 12 from a field of view 82. The field of view 82 can be beyond the emblem 26 (i.e., forward 22 or rearward 24 of the vehicle 10), beneath the emblem 26, above the emblem 26, to the side of the emblem 26, or some combination thereof. The image sensor unit 80 can be attached to the printed circuit board 40 or a secondary printed circuit board 40a beneath the cover assembly 44. The image sensor unit 80 may include a lens 84 that projects through an aperture 86 within the cover assembly 44, such as through the second piece 48 of the embodiment of the emblem 26 illustrated. The image sensor unit 80 can be configured to capture a series of images forming a video.

Figure 5:
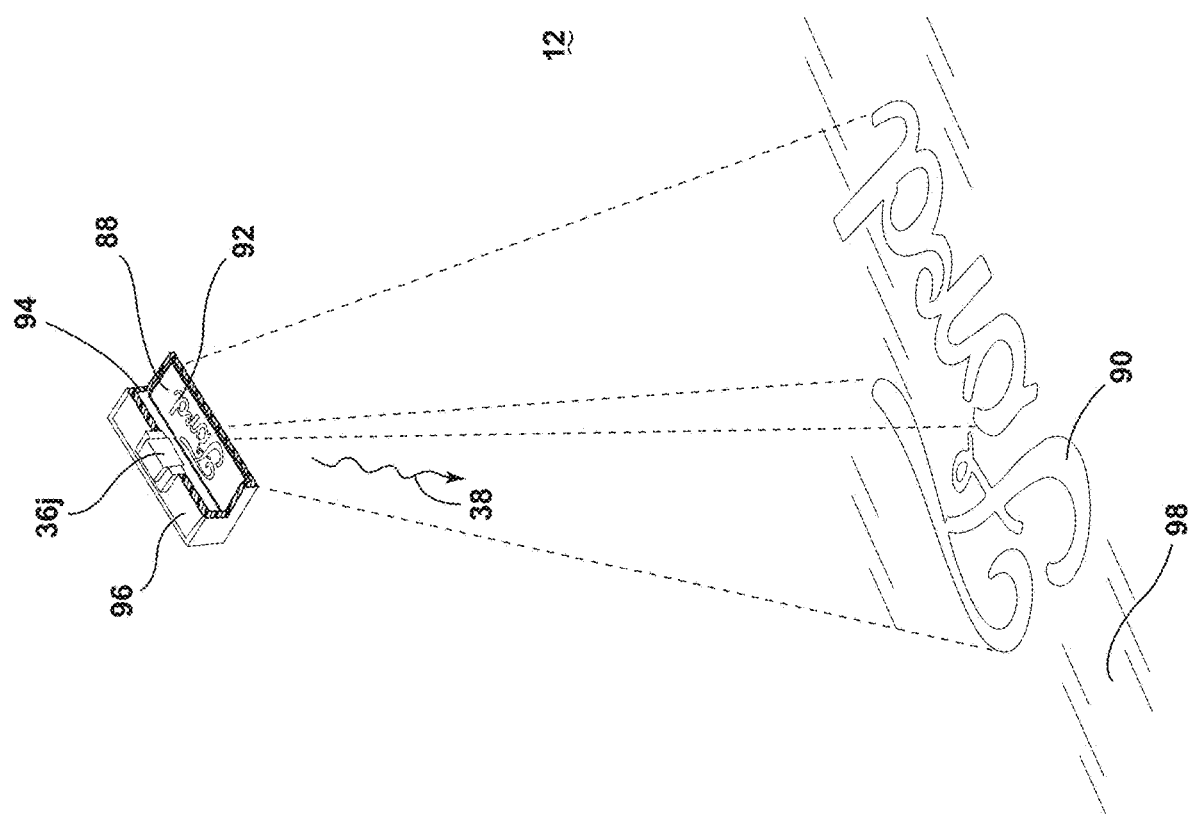
FIG. 5 is a perspective view of the image filter of FIG. 2B manipulating the visible light that the light source of the emblem emits into an image pattern projected onto a ground of the external environment.

Referring now additionally to FIG. 5, in embodiments, the emblem 26 further includes an image filter 88 disposed between the light source 36 and the external environment 12. The image filter 88 receives the visible light 38 emitted by the light source 36 and transmits the visible light 38 as an image pattern 90 that projects to the external environment 12. In embodiments, the image filter 88 can be an aperture 92 with the requisite shape to produce the desired projected image pattern 90. In those instances, a wall 94 surrounds the aperture 92 and blocks visible light 38 that the light source 36 emits, while the aperture 92 through the wall 94 allows the emitted visible light 38 to pass through with the image pattern 90 having a boundary provided by the aperture. In other embodiments, the image filter 88 can be photographic film with a positive or negative image of the image pattern 90. In such embodiments, the visible light 38 that the light source 36 emits transmits through the photographic film, which manipulates the visible light 38 into the image pattern 90 projected into the external environment 12.

In embodiments, the light source 36 includes a dedicated light source 36j that emits the visible light 38 in the direction of the image filter 88. In embodiments, the dedicated light source 36j and the image filter 88 are mounted within a housing 96. The housing 96 reduces leakage of visible light 38 that the dedicated light source 36j emits and increases the visible light 38 that transmits through the image filter 88 into the external environment 12 as the image pattern 90.

In embodiments, the image pattern 90 is projected downward such as onto a ground 98 of the external environment 12. In other embodiments, the image pattern 90 is projected upward into a sky 100 of the external environment 12 (such as to act as a location beacon), or onto the vehicle 10 (e.g., the exterior 14 of the vehicle 10).

Figure 6:
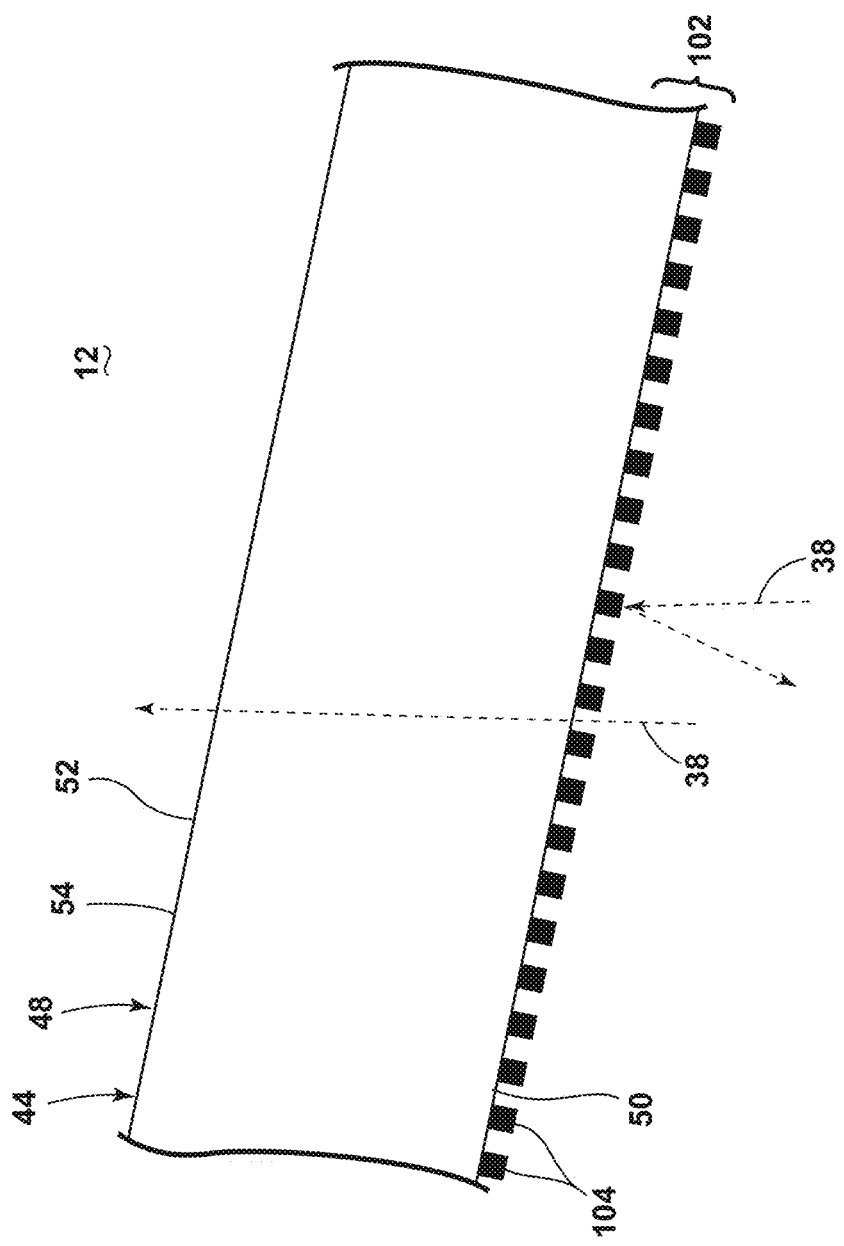
FIG. 6 is a cross-sectional view of area VI of FIG. 2F, illustrating the cover assembly having a metalized portion where metal has been deposited onto the inner surface of the cover assembly at an otherwise transparent portion, allowing the transmission of some of the visible light emitted from the light source of the emblem but reflecting some of the visible light.

Referring now additionally to FIG. 6, the cover assembly 44 of the emblem 26 further includes a metalized portion 102. The metalized portion 102 includes metal 104 deposited onto the transparent portion 54. In the illustrated embodiment, the metal 104 is deposited onto the transparent portion 54 of the second piece 48 of the cover assembly 44. The metal 104 reflects a portion of the visible light 38 that the light source 36 emits back into the emblem 26. However, the metalized portion 102 is only partially metalized so that the metalized portion 102 transmits at least a portion of the visible light 38 that the light source 36 emits into the external environment 12. As discussed above, the transparent portion 54, absent the metalized portion 102 transmits a percentage of incident visible light 38 from the light source 36 to the external environment 12 (e.g., at least 50 percent). The metalized portion 102 reduces the percentage of incident visible light 38 transmitted through the transparent portion 54 but still allows some of the incident visible light 38 to reach the transparent portion 54, transmit through the transparent portion 54, and reach the external environment 12. (e.g., at least 10 percent). This allows a viewer located at the external environment 12 to perceive both the appearance of metal 104 and the visible light 38. In embodiments, the metal 104 is deposited onto the inner surface 50 of the transparent portion 54. In other embodiments, the metal 104 is deposited onto the outer surface 52 of the transparent portion 54, or both the inner surface 50 and the outer surface 52. The metal 104 can be deposited through various processes, such a vacuum deposition process.

In embodiments, the emblem 26 further includes a reflective element 106 positioned to direct emitted visual light, such as from a dedicated light source 36k, toward the metalized portion 102. The reflective element 106 can be a mirror. The dedicated light source 36k can be positioned to direct the emitted visible light 38 toward the metalized portion 102 without the reflective element 106.

Figure 7A:
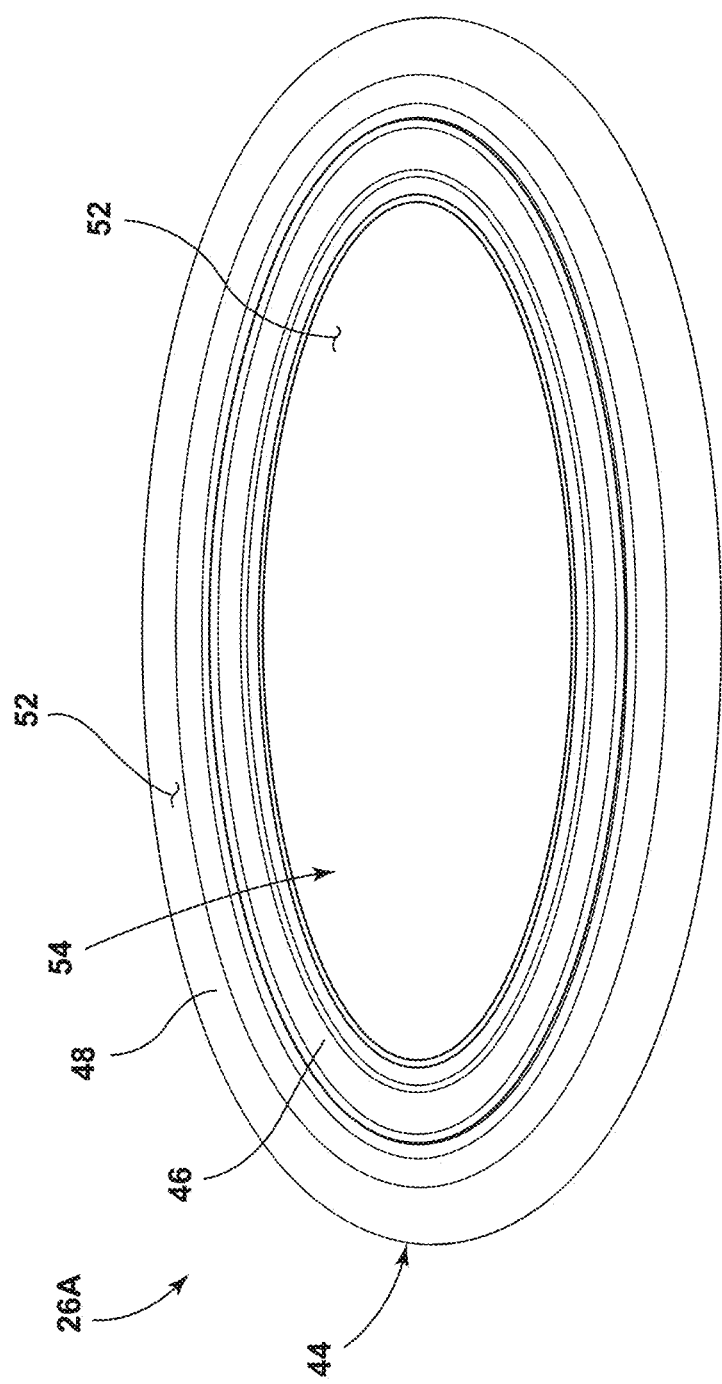
FIG. 7A is a view of another embodiment emblem, illustrating a cover assembly again having a transparent portion.
Figure 7B:
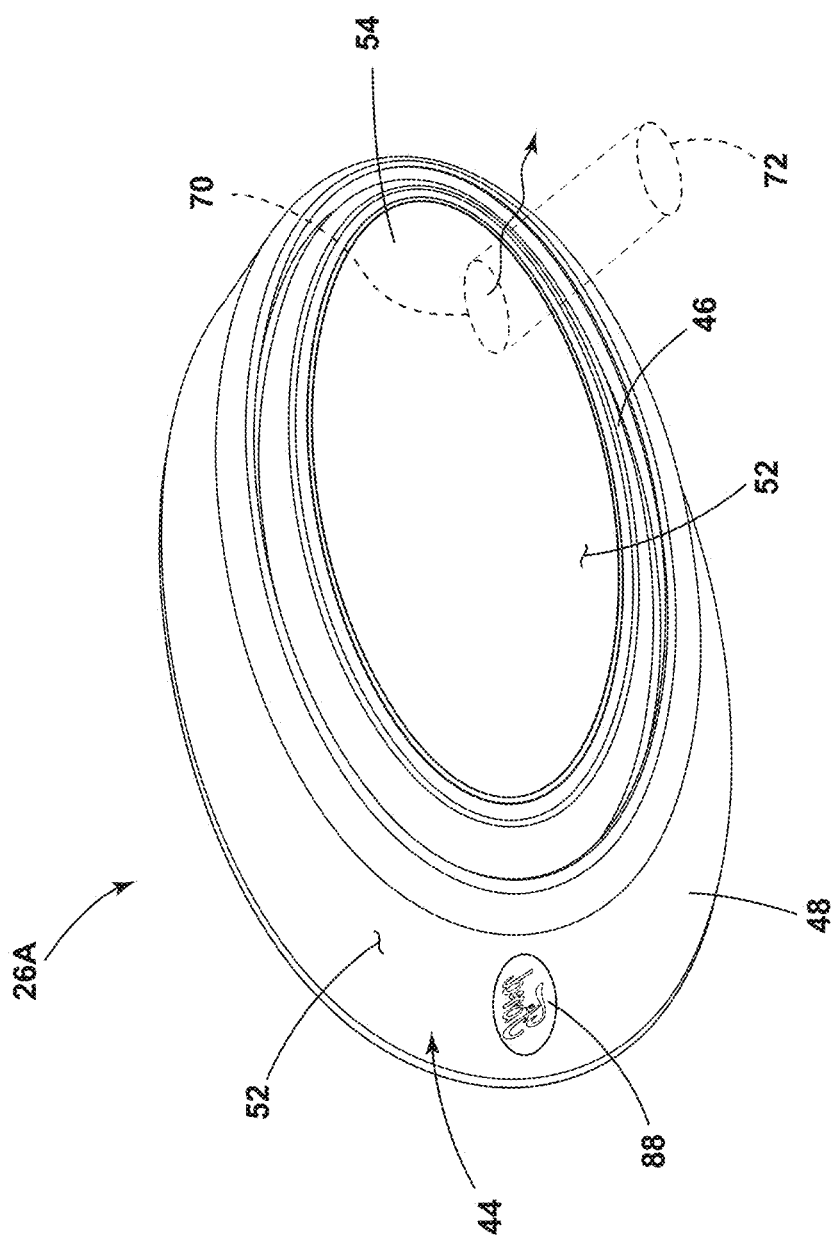
FIG. 7B is a perspective view of the emblem of FIG. 7A, illustrating the transparent portion having an interference pattern (i.e., hologram) that manipulates visible light emitted from a light source of the emblem into an object image.
Figure 7C:
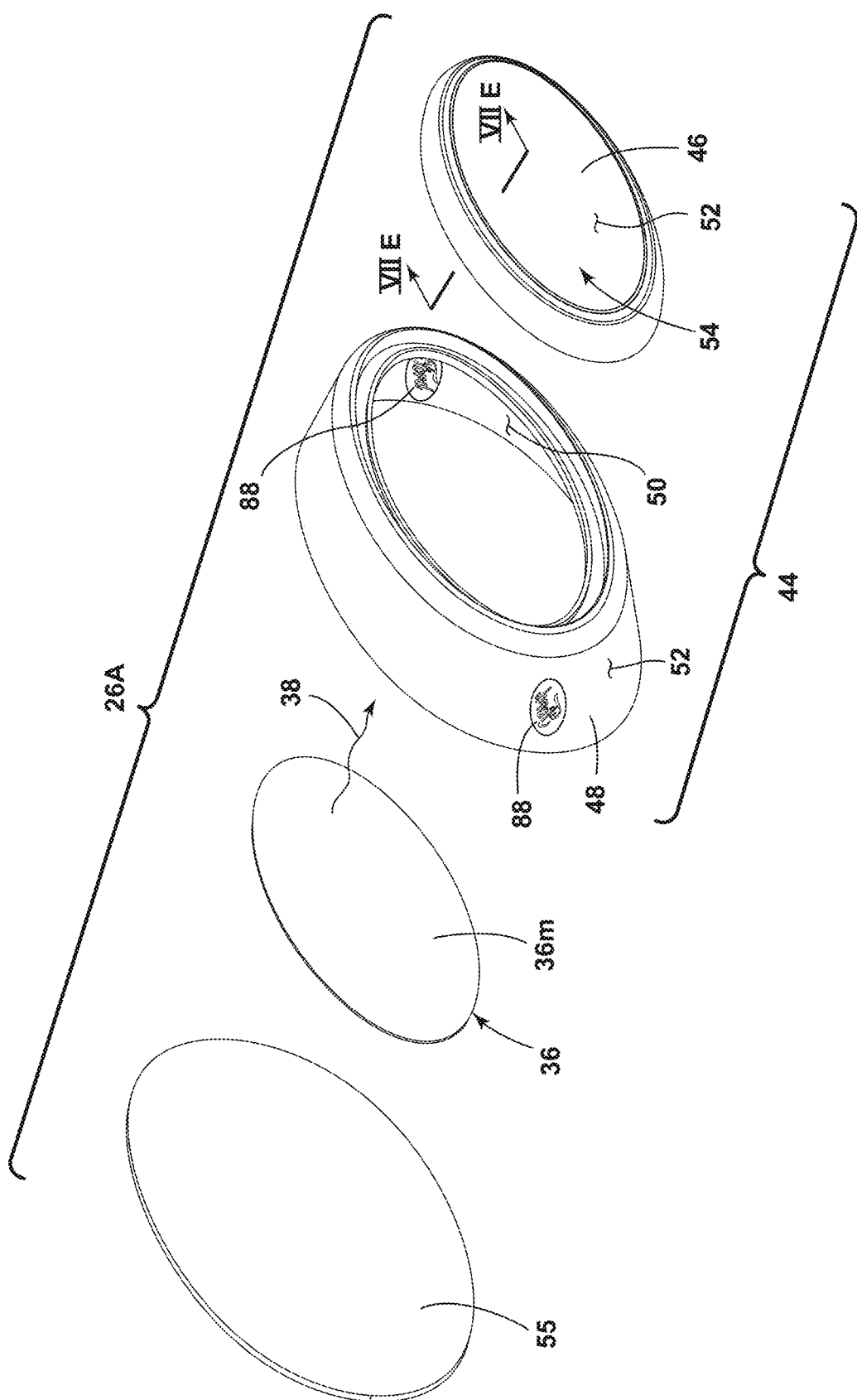
FIG. 7C is a perspective blown-up view of the emblem of FIG. 7A, illustrating a flat panel display as the light source of the emblem disposed beneath the cover assembly.
Figure 7D:
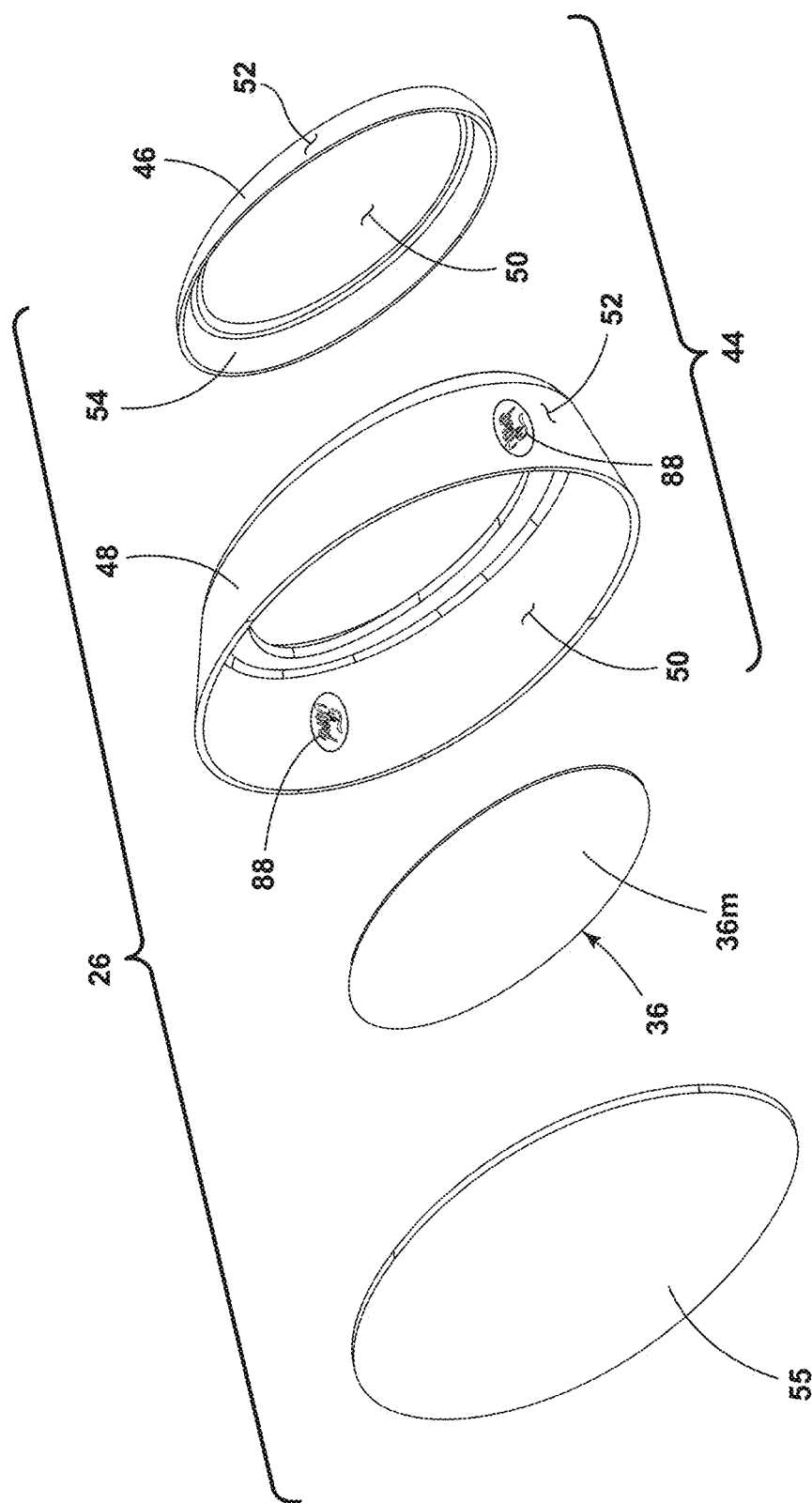
FIG. 7D is another perspective blown-up view of the emblem of FIG. 7A.
Figure 7E:
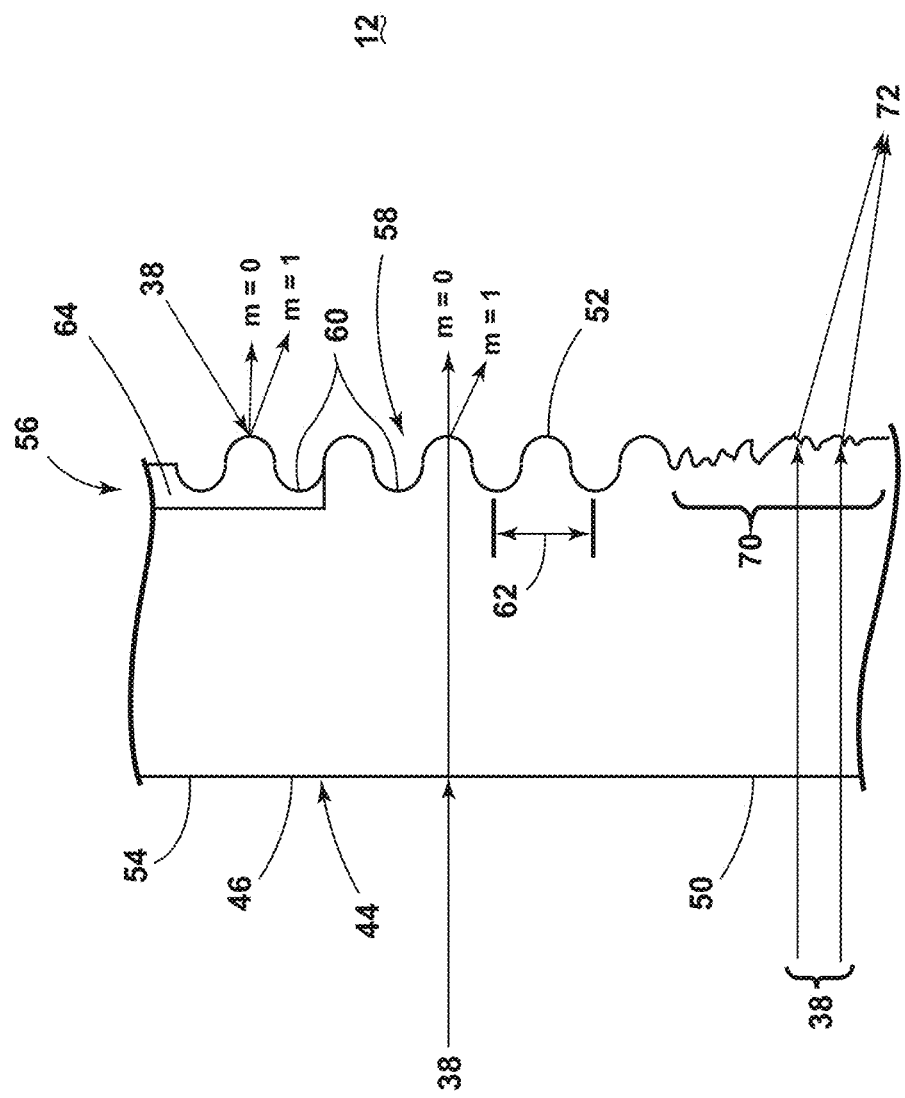
FIG. 7E is a cross-sectional view taken along the line VIIE-VIIE of FIG. 7C, illustrating the outer surface of the transparent portion of the cover assembly having a variety of surface relief patterns to manipulate the visible light that the light source of the emblem emits or from the external environment in various ways.

Referring now to FIGS. 7A-7C, another embodiment emblem 26A is herein described. The emblem 26A can include any of the features discussed above in connection with the emblem 26. Like naming and numbering refer to like features.

In embodiments, the emblem 26A includes a flat panel display 36m configured to emit the visible light 38. In other words, the light source 36 of the emblem 26A includes the flat panel display 36m. The flat panel display 36m can be a liquid crystal display, and can include light emitting diode backlighting. The flat panel display 36m can be a light emitting diode display, including an organic light emitting diode display and a quantum dot light emitting diode display. The flat panel display 36m can include pixel states that are volatile or static. Any embodiments of the emblem 26 described above can include the flat panel display 36m of the emblem 26A as the light source 36.

As with the emblem 26, the emblem 26A further includes a cover assembly 44. The cover assembly 44 is disposed over the flat panel display 36m. The cover assembly 44 includes an inner surface 50 and an outer surface 52. The inner surface 50 is disposed closer to the flat panel display 36m than the outer surface 52. The outer surface 52 is disposed closer to the external environment 12 beyond the emblem 26A than the inner surface 50. The cover assembly 44 further includes a transparent portion 54 that is transparent to the visible light 38 that the flat panel display 36m emits. The visible light 38 is incident to the inner surface 50.

The visible light 38 then transmits through the transparent portion 54 exiting the outer surface 52 to the external environment 12 beyond the emblem 26A. In embodiments, the cover assembly 44 includes a first piece 46 and a second piece 48, to which the first piece 46 is attached. The transparent portion 54 can be coextensive with the first piece 46. The transparent portion 54 can be disposed at both the first piece 46 and the second piece 48.

In embodiments, the visible light 38 that the flat panel display 36*m* emits is a logo, text, symbol, or the like. In embodiments, the visible light 38 that the flat panel display 36*m* emits is a motion picture.

In embodiments, the emblem 26A further includes a surface relief pattern 56 disposed on the cover assembly 44. The surface relief pattern 56 is configured to manipulate (i) the visible light 38 that the flat panel display 36*m* emits, (ii) visible light 38 from the external environment 12, or both (i) and (ii). The surface relief pattern 56 can take any of the shapes described above with the emblem 26 and perform any of the described functions. For example, in embodiments, the surface relief pattern 56 includes an interference pattern 70 that produces an object image 72, the object image 72 being visible from the external environment 12. As another example, in embodiments, the surface relief pattern 56 includes a diffraction grating 58, as described above, that manipulates the visible light 38 that the light source 36 emits into different orders. The orders aside from the zeroth order separate out the different wavelengths in the visible light 38, which can produce a sparkle appearance. A reflective layer 64 can assist the diffraction grating 58 in reflecting visible light 38 from the external environment 12.

In embodiments, the emblem 26A further includes an image filter 88. The image filter 88 can be disposed at the second piece 48 of the cover assembly 44. The image filter 88 can project an image pattern 90 into the external environment 12, as discussed with the emblem 26 above. Alternatively, the emblem 26A can include more than one flat panel display 36.

Figure 8:
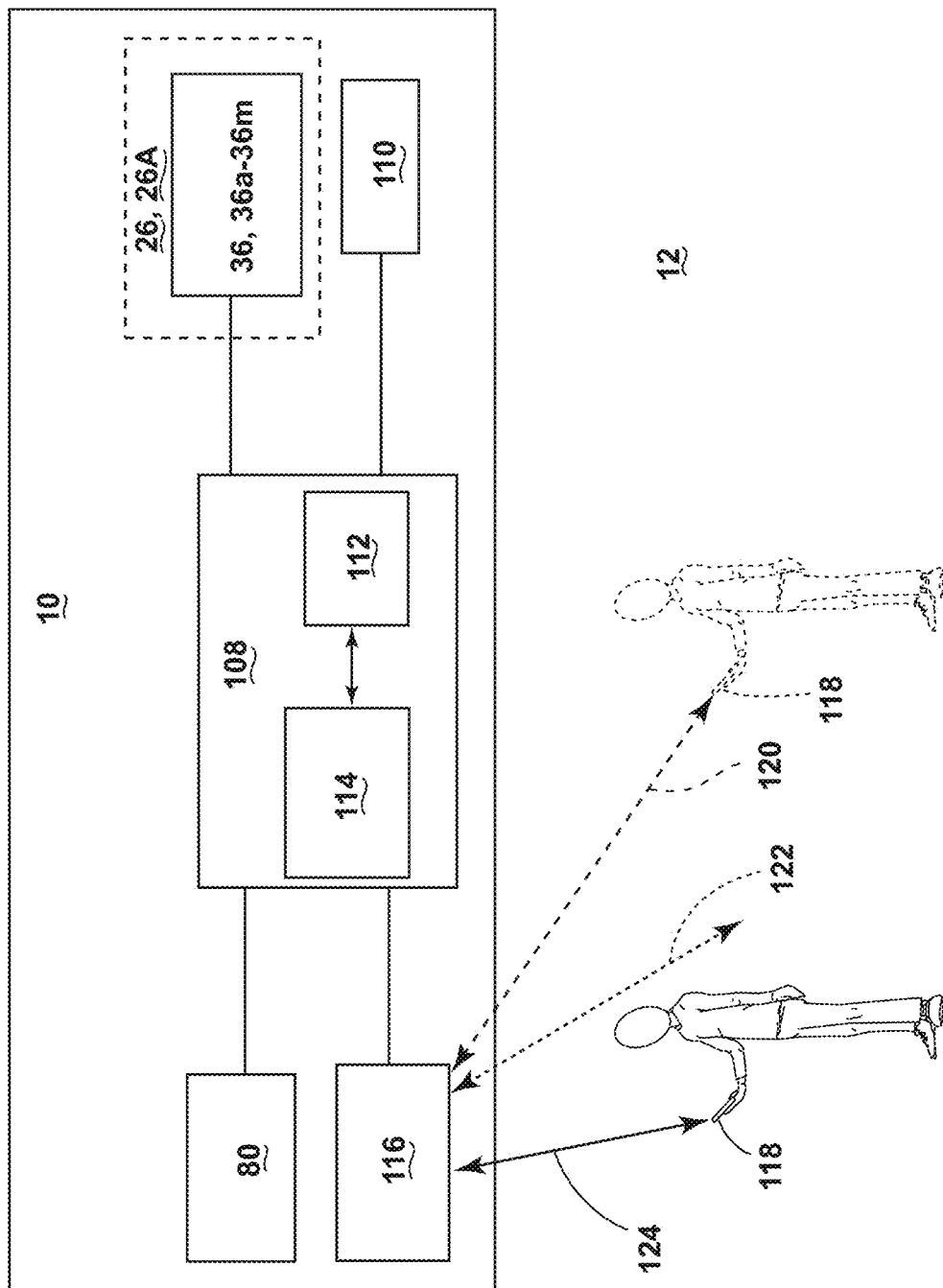
FIG. 8 is a schematic of the vehicle of FIG. 1A, illustrating the vehicle including a controller in communication with the light source of the emblem and an antenna module, which ascertains a distance between an authorized mobile device and the antenna module, and the controller activates the light source of the emblem as a function of that distance.

Referring now to FIG. 8, in embodiments, the vehicle 10 further includes a controller 108. In embodiments, the vehicle 10 further includes a display 110 viewable from the interior 16 of the vehicle 10. The controller 108 is in communication with the light source 36, the display 110, and the image sensor unit 80. The controller 108 includes memory 112 and a processor 114. The memory 112 can be volatile memory (e.g., RAM), non-volatile memory (e.g., disk or FLASH memory), among other options. The processor 114 can be any suitable processing device or set of processing devices, such as a microprocessor, a microcontroller-based platform, a suitable integrated circuit, one or more field programmable gate arrays (FPGAs), and/or one or more application-specific integrated circuits (ASICs). The processor 114 executes instructions (e.g., programs, software) stored in the memory 112 to achieve the functions described herein.

In embodiments, the controller 108 accepts image data that the image sensor unit 80 captures. The controller 108 can utilize the image data to assist the vehicle 10 in autonomous driving operations, such as for parking and security. In addition, or in the alternative, the controller 108 can cause the display 110 disposed in the interior 16 to display the image data collected that the image sensor unit 80 of the emblem 26, 26A captures.

In embodiments, the vehicle 10 further includes an antenna module 116 that is in communication with the controller 108. The antenna module 116 is in further communication with an authorized mobile device 118. The authorized mobile device 118 can be a key fob, a smart phone, a tablet, and the like. The antenna module 116 can include hardware, such as processors, memory, and an antenna, and software to control a wireless network interface. The antenna module 116 includes a communication controller for a personal or local area wireless network, such as Bluetooth® and Wi-Fi®, and the like. The authorized mobile device 118 establishes a connection with the authorized mobile device 118 and measures the signal strength of the signals that the authorized mobile device 118 sends. For example, the antenna module 116 can measure a received signal strength indicator, a reception strength value, or both. Received signal strength indicator is typically a signal strength percentage (e.g., 0 to 100 percent). Reception strength value is measured in decibel milliwatts. Both signal strength percentage and measured decibel watts are indicative of a distance of the authorized mobile device 118 from the antenna module 116 and thus the vehicle 10. Experimental correlations can be made for any particular antenna module 116 positioned within the vehicle 10.

In embodiments, the controller 108 is configured to cause the light source 36 of the emblem 26, 26A to emit the visible light 38 upon a detected triggering event. In embodiments, the detected triggering event includes the detection that the distance between the authorized mobile device 118 and the antenna module 116 has (i) moved from a far position 120 exceeding a predetermined distance 122 from the vehicle 10 to a near position 124 within the predetermined distance 122 from the vehicle 10, or (ii) moved from the near position 124 to the far position 120. "Near" and "far" here are terms relative to each other, and not meant to suggest any particular distance from the antenna module 116. In the near position 124, the authorized mobile device 118 is closer to the antenna module 116 than in the far position 120. In embodiments of the emblem 26, 26A that include the image filter 88, causing the light source 36 to emit visible light 38 results in the image filter 88 receiving the visible light 38 and transmitting the visible light 38 as the image pattern 90 into the external environment 12 (e.g., the ground, the exterior 14 of the vehicle 10, the sky 100).

The antenna module 116 can track signal strength indicator or reception strength values as a function of time (and therefore distance as a function of time). The controller 108 or the antenna module 116 can store the track signal strength indicator or reception strength values periodically (e.g., every tenth of a second) in the memory 112. By comparing values indicative of distance as a function of time, the controller 108 can determine whether the authorized mobile device 118 is approaching the vehicle 10 or moving away from the vehicle 10. The controller 108 can begin storing values indicative of distance after detecting the authorized mobile device 118.

The predetermined distance 122 can be 10 feet (approximately 3 meters), or any other predetermined value. When the antenna module 116 receives signal strength indicator or reception strength value and calculates from such that the authorized mobile device 118 has moved from the far position 120 of greater than 10 feet (or whatever the predetermined distance 122 is) to the near position 124 within 10 feet (or whatever the predetermined distance 122 is), the triggering event has occurred and the controller 108 can cause the light source 36 of the emblem 26, 26A to emit the visible light 38. The controller 108 can do so along with activating other functions as part of a "welcome" mode to welcome the person with the authorized mobile device 118 to the vehicle 10, such as changing seat position, and the like. The controller 108 can maintain activation of the light source 36 for a predetermined period of time or until some other triggering event (e.g., sensed opening of the door 28, starting of the electric motor or combustion engine, activating climate control functions).

When the antenna module 116 receives signal strength indicator or reception strength value and calculates from such that the authorized mobile device 118 has moved from the near position 124 of less than 10 feet (or whatever the predetermined distance 122 is) to the far position 120 greater than 10 feet (or whatever the predetermined distance 122 is), the triggering event has occurred, and the controller 108 can cause the light source 36 of the emblem 26, 26A to emit the visible light 38. The controller 108 can do so along with activating other functions as part of a "farewell" mode to bid the person with the authorized mobile device 118 farewell. The controller 108 can maintain activation of the light source 36 for a predetermined period of time or until some other triggering event (e.g., the antenna module 116 loses connection with the authorized mobile device 118).

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An emblem for a vehicle comprising:
a light source configured to emit visible light;
a cover assembly disposed over the light source, the cover assembly comprising an inner surface, an outer surface, and a transparent portion that is transparent to the visible light, the visible light being incident to the inner surface, and the visible light that the light source emits enters the transparent portion at the inner surface, transmits through the transparent portion, and then transmits out of the outer surface to an external environment beyond the emblem; and
an image filter disposed between the light source and the external environment, the image filter comprising an aperture and a wall surrounding the aperture, the wall blocking visible light that the light source emits;
wherein, the image filter receives the visible light emitted by the light source and transmits the visible light as an image pattern that projects to the external environment, the visible light passing through the aperture with the image pattern having a boundary provided by the aperture; and
wherein, the cover assembly further comprises a surface relief pattern disposed on the cover assembly through which the visible light transmits, and the surface relief pattern is configured to manipulate the visible light that the light source emits.

2. The emblem of claim 1 further comprising:
a light guide disposed between the light source and the cover assembly, the light guide having (i) a first end positioned to accept the visible light emitted by the light source and (ii) a second end positioned to emit the visible light toward the transparent portion of the cover assembly.

3. The emblem of claim 2, wherein
the light source comprises a first laser diode configured to emit light having a dominant wavelength of 625 nm to 740 nm, a second laser diode configured to emit light having a dominant wavelength of 500 nm to 575 nm, and a third laser diode configured to emit light having a dominant wavelength of 450 nm to 485 nm; and
the visible light of the different wavelengths intermixes within the light guide and transmits through the second end of the light guide as visible light with a substantially white color.

4. The emblem of claim 2, wherein
the second end of the light guide is visible through the transparent portion of the cover assembly from the external environment when the light source is not emitting light.

5. The emblem of claim 1, wherein
the light source comprises a laser diode.

6. The emblem of claim 1 further comprising:
an image sensor unit positioned to capture an image of the external environment.

7. The emblem of claim 1, wherein
the surface relief pattern comprises a diffraction grating that is configured to manipulate the visible light that the light source emits.

8. The emblem of claim 7, wherein
the light source is configured to emit visible light having wavelengths of (i) 625 nm to 740 nm, (ii) 500 nm to 575 nm, and (iii) 450 nm to 485 nm.

9. The emblem of claim 1, wherein
the cover assembly further comprises a diffraction grating disposed into a reflective layer, and the diffraction grating is configured to manipulate visible light from the external environment.

10. The emblem of claim 1, wherein
the surface relief pattern comprises an interference pattern that produces an object image, and the object image is visible from the external environment.

11. The emblem of claim 10 further comprising:
a light guide disposed between the light source and the cover assembly, the light guide having (i) a first end positioned to accept the visible light emitted by the light source and (ii) a second end positioned to emit the visible light toward the transparent portion of the cover assembly;
wherein, the light source comprises a first laser diode configured to emit light having a dominant wavelength of 625 nm to 740 nm, a second laser diode configured to emit light having a dominant wavelength of 500 nm to 575 nm, and a third laser diode configured to emit light having a dominant wavelength of 450 nm to 485 nm;
wherein, the visible light of the different wavelengths intermixes within the light guide and transmits through the second end of the light guide as visible light with a substantially white color, and
the interference pattern manipulates the visible light having the substantially white color to produce the image of the object.

12. The emblem of claim 1, wherein
the cover assembly further comprises a metalized portion comprising metal deposited onto the transparent portion; and the metalized portion transmits at least a portion of the visible light emitted by the light source to the external environment.

13. The emblem of claim 1, wherein the light source comprises a flat panel display.

14. The emblem of claim 13 further comprising: a second surface relief pattern configured to manipulate visible light from the external environment.

15. The emblem of claim 13, wherein the surface relief pattern comprises an interference pattern that produces an image of an object, and the image is visible from the external environment.

16. The emblem of claim 13, wherein the surface relief pattern comprises a diffraction grating that is configured to manipulate the visible light that the flat panel display emits.

17. An emblem for a vehicle comprising:
a light source configured to emit visible light; and
a cover assembly disposed over the light source, the cover assembly comprising an inner surface, an outer surface, and a transparent portion that is transparent to the visible light, the visible light being incident to the inner surface, and the visible light that the light source emits transmits through the inner surface, through the transparent portion, and then through the outer surface to an external environment beyond the emblem;
wherein, the cover assembly further comprises an interference pattern configured to manipulate (i) the visible light that the light source emits, (ii) visible light from the external environment, or (iii) both (i) and (ii) to produce an object image that is visible from the external environment as a three-dimensional light field, wherein the interference pattern (i) is not periodic and (ii) comprises a hologram.

18. The emblem of claim 17 further comprising:
a light guide disposed between the light source and the cover assembly, the light guide having (i) a first end positioned to accept the visible light emitted by the light source and (ii) a second end positioned to emit the visible light toward the transparent portion of the cover assembly.

19. An emblem for a vehicle comprising:
a light source configured to emit visible light;
a cover assembly disposed over the light source, the cover assembly comprising an inner surface, an outer surface, and a transparent portion that is transparent to the visible light, the visible light being incident to the inner surface, and the visible light that the light source emits enters the transparent portion at the inner surface, transmits through the transparent portion, and then transmits out of the outer surface to an external environment beyond the emblem; and
an image filter disposed between the light source and the external environment, the image filter comprising a photographic film with a positive or negative image of an image pattern, and the visible light that the light source emits transmits through the photographic film, which manipulates the visible light into the image pattern projected into the external environment;
wherein, the cover assembly further comprises a surface relief pattern disposed on the cover assembly through which the visible light transmits, and the surface relief pattern is configured to manipulate the visible light that the light source emits.

* * * * *